United States Patent
Bassill et al.

(10) Patent No.: US 11,609,121 B2
(45) Date of Patent: Mar. 21, 2023

(54) SENSOR AND CONTROL SYSTEMS FOR FOOD PREPARATION

(71) Applicant: HATCO CORPORATION, Milwaukee, WI (US)

(72) Inventors: Nick Bassill, Milwaukee, WI (US); John Scanlon, Milwaukee, WI (US); Fei Shang, Milwaukee, WI (US); Ishan Shah, Milwaukee, WI (US); Mark Gilpatric, Milwaukee, WI (US); Dave Rolston, Milwaukee, WI (US); Ronghua Yu, Milwaukee, WI (US)

(73) Assignee: Hatco Corporation, Milwaukee, WI (US)

( * ) Notice: Subject to any disclaimer, the term of this patent is extended or adjusted under 35 U.S.C. 154(b) by 927 days.

(21) Appl. No.: 16/416,124

(22) Filed: May 17, 2019

(65) Prior Publication Data
US 2019/0353527 A1    Nov. 21, 2019

Related U.S. Application Data

(60) Provisional application No. 62/673,768, filed on May 18, 2018, provisional application No. 62/673,778, filed on May 18, 2018, provisional application No. 62/673,780, filed on May 18, 2018, provisional application No. 62/673,763, filed on May 18, 2018.

(51) Int. Cl.
| | | |
|---|---|---|
| *G01J 5/04* | (2006.01) | |
| *A21B 1/40* | (2006.01) | |
| *F24C 7/08* | (2006.01) | |
| *A47J 27/00* | (2006.01) | |
| *A47J 36/00* | (2006.01) | |

(52) U.S. Cl.
CPC ...... *G01J 5/04* (2013.01); *A21B 1/40* (2013.01); *A47J 27/002* (2013.01); *A47J 36/00* (2013.01); *F24C 7/087* (2013.01)

(58) Field of Classification Search
CPC . A21B 1/40; A47J 27/002; A47J 36/00; G01J 5/04; F24C 7/087; H05B 6/062; H05B 6/1209; H05B 1/0266; H05B 2213/06; H05B 2213/07
USPC .............................. 219/413, 624, 627, 667
See application file for complete search history.

(56) References Cited

U.S. PATENT DOCUMENTS

| | | |
|---|---|---|
| 3,632,983 A | 1/1972 | Dills |
| 4,363,956 A | 12/1982 | Scheidler et al. |
| (Continued) | | |

FOREIGN PATENT DOCUMENTS

| | | |
|---|---|---|
| DE | 10 2005 058 505 A1 | 6/2007 |
| DE | 10 2015 201 079 A1 | 9/2015 |
| (Continued) | | |

*Primary Examiner* — Phuong T Nguyen
(74) *Attorney, Agent, or Firm* — Foley & Lardner LLP

(57) ABSTRACT

A temperature-regulating unit includes a base, a thermal element, a contactless sensing assembly, and a controller. The base is configured to support at least one of a pan or a food product. The thermal element is positioned to thermally regulate the at least one of the pan or the food product. The contactless sensing assembly is positioned to acquire sensor data regarding the at least one of the pan or the food product. The controller is configured to receive the sensor data from the contactless sensing assembly and adaptively control the thermal element based on the sensor data.

17 Claims, 14 Drawing Sheets

(56) References Cited

U.S. PATENT DOCUMENTS

| | | | |
|---|---|---|---|
| 6,436,796 | B1 | 8/2002 | Mailho et al. |
| 6,736,901 | B2 | 5/2004 | Nishibayashi |
| 8,124,200 | B2 | 2/2012 | Quella et al. |
| 8,269,149 | B2 | 9/2012 | Acero Acero et al. |
| 8,968,848 | B2 | 3/2015 | Quella et al. |
| 10,582,573 | B2 | 3/2020 | Hoare et al. |
| 11,156,364 | B2 | 10/2021 | Yang |
| 2002/0125245 | A1 | 9/2002 | Fuchs |
| 2009/0057298 | A1* | 3/2009 | Komma ............... H05B 6/1209 307/104 |
| 2012/0063799 | A1 | 3/2012 | Ueno |
| 2013/0037535 | A1 | 2/2013 | Ogasawara et al. |
| 2013/0140297 | A1* | 6/2013 | Okuda ................. H05B 6/062 219/667 |
| 2015/0008755 | A1 | 1/2015 | Sone |
| 2016/0014849 | A1* | 1/2016 | Hegedis ................ G01K 1/143 219/627 |
| 2019/0029081 | A1 | 1/2019 | Nam et al. |
| 2019/0203871 | A1 | 7/2019 | Gawryla et al. |
| 2020/0010332 | A1 | 1/2020 | Lang |

FOREIGN PATENT DOCUMENTS

| | | |
|---|---|---|
| GB | 2 552 531 | 1/2018 |
| JP | 02-114488 A | 4/1990 |
| JP | 07-226288 A | 8/1995 |
| JP | 2002-083674 | 3/2002 |
| KR | 20110076166 A | 7/2011 |

\* cited by examiner

SENSOR AND CONTROL SYSTEMS FOR FOOD PREPARATION

CROSS-REFERENCE TO RELATED PATENT APPLICATIONS

This application (a) claims the benefit of U.S. Provisional Patent Application No. 62/673,763, filed May 18, 2018, U.S. Provisional Patent Application No. 62/673,768, filed May 18, 2018, U.S. Provisional Patent Application No. 62/673,778, filed May 18, 2018, and U.S. Provisional Patent Application No. 62/673,780, filed May 18, 2018, and (b) is related to (i) U.S. patent application Ser. No. 16/415,937, filed May 17, 2019, which claims the benefit of U.S. Provisional Patent Application No. 62/673,762, filed May 18, 2018, (ii) U.S. patent application Ser. No. 16/415,943, filed May 17, 2019, which claims the benefit of U.S. Provisional Patent Application No. 62/673,781, filed May 18, 2018, and U.S. Provisional Patent Application No. 62/673,785, filed May 18, 2018, and (iii) U.S. patent application Ser. No. 16/416,111, filed May 17, 2019, which claims the benefit of U.S. Provisional Patent Application No. 62/673,769, filed May 18, 2018, U.S. Provisional Patent Application No. 62/673,772, filed May 18, 2018, and U.S. Provisional Patent Application No. 62/673,775, filed May 18, 2018, all of which are incorporated herein by reference in their entireties.

BACKGROUND

Temperature feedback when preparing food can provide for a better cooking experience, as well as improve the taste, quality, and enjoyment of the food. Traditional temperature feedback systems use temperature-sensing mechanisms that require direct contact with the food or the pan in which the food is being prepared or stored. However, contact-type sensing mechanisms may not make sufficient contact with the pan and can be easily damaged during use.

SUMMARY

One embodiment relates to a temperature-regulating unit. The temperature-regulating unit includes a base, a thermal element, a contactless sensing assembly, and a controller. The base is configured to support at least one of a pan or a food product. The thermal element is positioned to thermally regulate the at least one of the pan or the food product. The contactless sensing assembly is positioned to acquire sensor data regarding the at least one of the pan or the food product. The controller is configured to receive the sensor data from the contactless sensing assembly and adaptively control the thermal element based on the sensor data.

Another embodiment relates to a temperature sensing and control system. The temperature sensing and control system includes a sensing coil and a controller. The sensing coil is configured to be positioned within a temperature-regulating unit and spaced from a pan. The sensing coil has a resonant frequency that is affected by a presence of the pan. The temperature regulating-unit includes a thermal element positioned to thermally regulate a temperature of the pan. The controller is configured to monitor the resonant frequency of the sensing coil, determine that the pan is present based on the resonant frequency, and determine the temperature of the pan based on the resonant frequency.

Still another embodiment relates to a temperature sensing and control system. The temperature sensing and control system includes a temperature probe and a controller. The temperature probe includes an elongated body and a plurality of temperature sensors positioned along a length of the elongated body. Each of the plurality of temperature sensors is configured to acquire temperature data regarding a temperature of a food product at a respective depth of the food product. The controller is configured to receive the temperature data from the plurality of temperature sensors and determine a level or a thickness of the food product based on the temperature data.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Contactless Inductive Sensing and Control System

Figure 1:
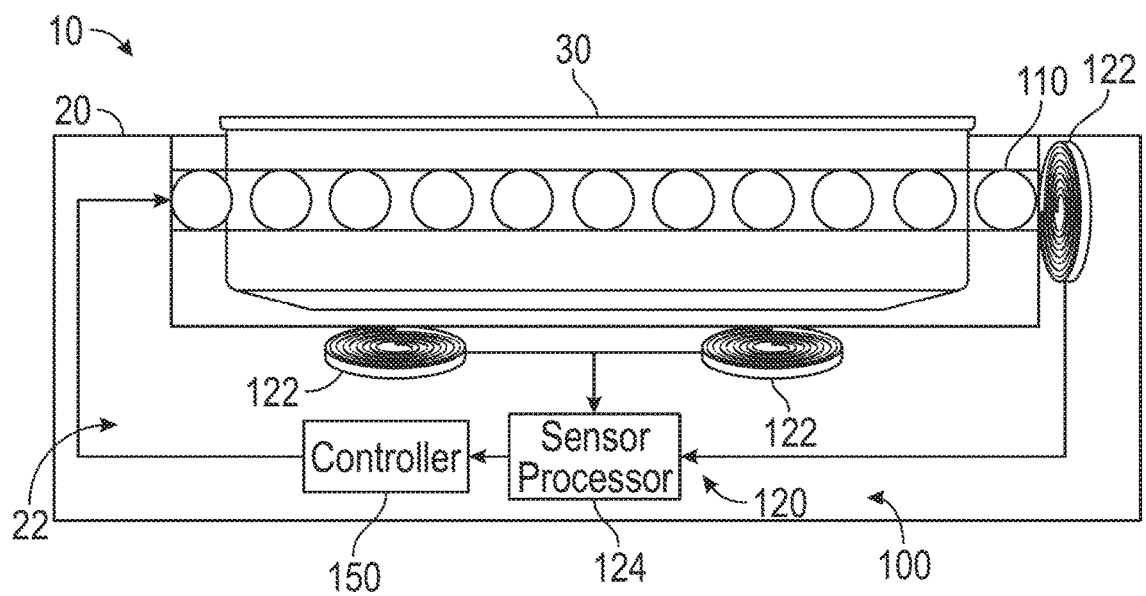
FIGS. 1-3 are various views of a temperature-regulating unit having a contactless inductive sensing and control system, according to various exemplary embodiments.
Figure 2:
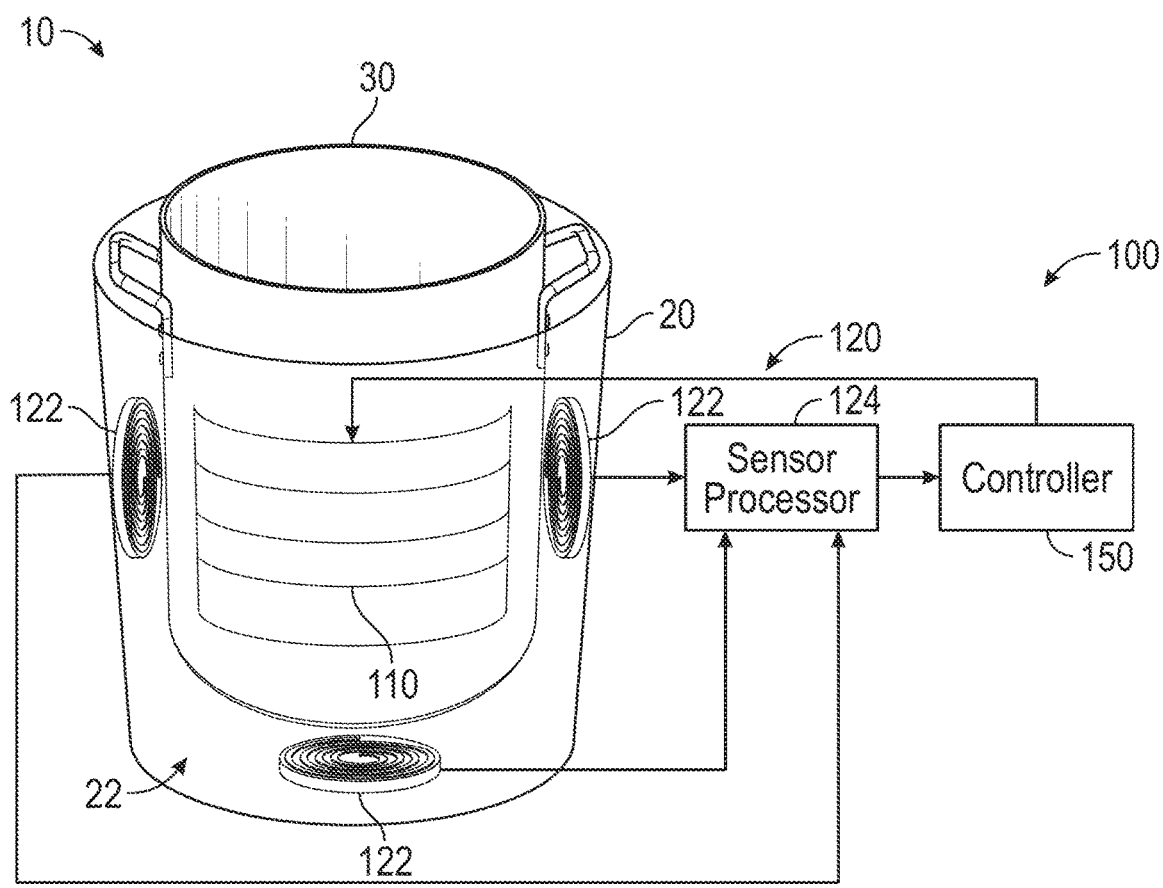
Figure 3:
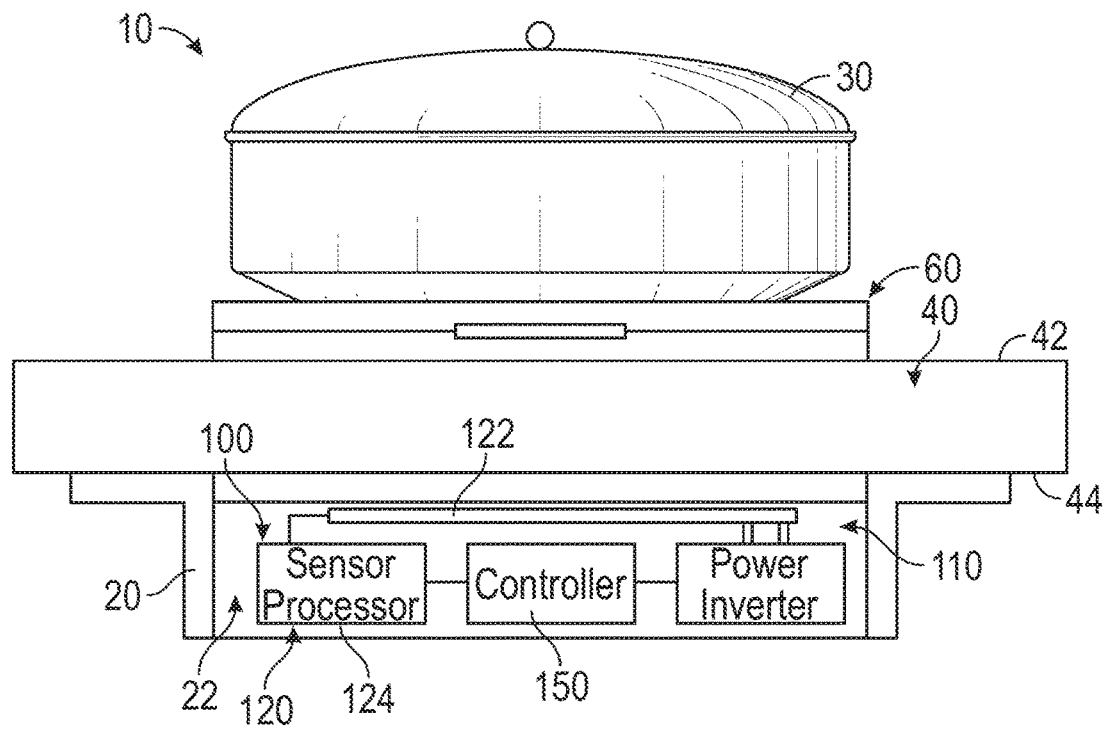

According to the exemplary embodiments shown in FIGS. 1-3, a temperature-regulating system, shown as temperature-regulating unit 10, includes a contactless sensing and control system, shown as inductive sensing and control system 100. As shown FIGS. 1-3, the temperature-regulating unit 10 includes a base or enclosure, shown as housing 20, that defines an interior chamber, shown as internal cavity 22, that receives the inductive sensing and control system 100.

As shown in FIGS. 1-3, the temperature-regulating unit 10 is configured to receive, hold, or otherwise support an item of cookware (e.g., a tray, a pan, a pot, etc.), shown as pan 30. In various embodiments (e.g., embodiments where the temperature-regulating unit 10 includes inductive thermal elements, etc.), the pan 30 is an electrically conductive and/or magnetic pan manufactured from a material such as cast iron, carbon steel, magnetic stainless steel, and/or any other material suitable for use with an induction heating system. In other embodiments (e.g., embodiments where the temperature-regulating unit 10 includes non-inductive thermal elements, etc.), the pan 30 is manufactured from a non-electrically conductive or non-magnetic material such as ceramics, porcelain, non-magnetic metals, etc. According to the exemplary embodiment shown in FIG. 1, the temperature-regulating unit 10 is configured a hot and/or cold well that receives and recesses the pan 30 within the internal cavity 22 of the housing 20. According to the exemplary embodiment shown in FIG. 2, the temperature-regulating unit 10 is configured a soup well that receives and recesses the pan 30 within the internal cavity 22 of the housing 20.

According to the exemplary embodiment shown in FIG. 3, the temperature-regulating unit 10 is configured as a surface temperature-regulating unit (e.g., an induction range, a cooktop, a cooling countertop, etc.). As shown in FIG. 3, the temperature-regulating unit 10 includes a support surface (e.g., a cooktop, a cooling plate, etc.), shown as countertop 40, having a first surface, shown as top surface 42, and an opposing second surface, shown as bottom surface 44. In one embodiment, the countertop 40 is manufactured from a stone or other decorative finishing material (e.g., granite, marble, quartz, wood, etc.). In other embodiments, the countertop 40 is manufactured from a ceramic material (e.g., ceramic glass, etc.). In still other embodiments, the countertop 40 is manufactured from a metal or metal alloy (e.g., stainless steel, cast iron, aluminum, copper, etc.). As shown in FIG. 3, the housing 20 is coupled to the bottom surface 44 of the countertop 40, enclosing the internal cavity 22. In some embodiments, the housing 20 is releasably secured to the bottom surface 44 of the countertop 40 (e.g., with fasteners, a detachable bracket, latches, etc.). In some embodiments, the housing 20 is adhesively secured to the bottom surface 44 of the countertop 40.

Figure 4:
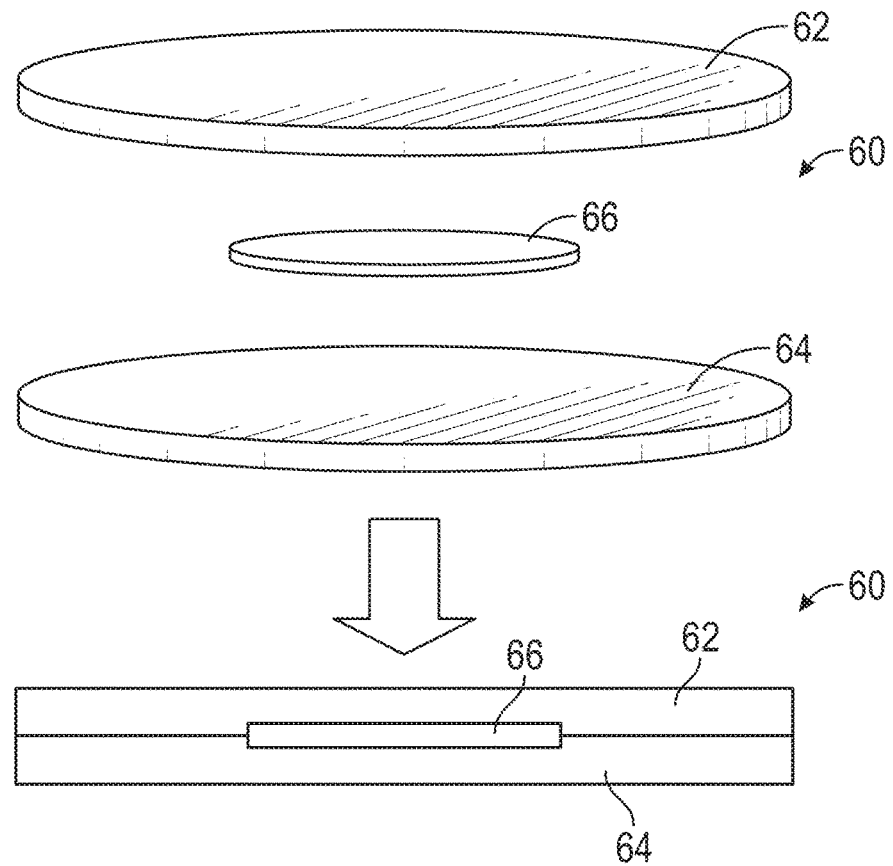
FIG. 4 shows various view of a trivet of the temperature-regulating unit of FIG. 3, according to an exemplary embodiment.

As shown in FIG. 3, the temperature-regulating unit 10 includes an intermediate insulator, shown as trivet 60, positioned along the top surface 42 of the countertop 40 and the pan 30. As shown in FIG. 4, the trivet 60 includes a upper portion, shown as insulator 62, a lower portion, shown as support 64, and an intermediate portion, shown as trivet identifier 66, disposed (e.g., sandwiched, etc.) between the insulator 62 and the support 64. According to an exemplary embodiment, the trivet identifier 66 is manufactured from a material that (i) is different than the material of the pan 30 and (ii) detectable and identifiable by the inductive sensing and control system 100, as is described in more detail herein. In some embodiments, the trivet identifier 66 of the trivet 60 facilitates centering of the pan 30 relative to a thermal element of the temperature-regulating unit 10 to facilitate achieving maximum thermal efficiency, as is also described in more detail herein.

According to an exemplary embodiment, the trivet 60 is positioned to insulate and protect the countertop 40 from the high heat of the pan 30. By way of example, the trivet 60 may be positioned between the pan 30 and the countertop 40 to prevent breaking, cracking, burning, and/or otherwise damaging the countertop 40 that may be caused from excessive heat exposure (e.g., in embodiments where the countertop 40 is manufactured from a decorative finishing material, etc.). In some embodiments, the temperature-regulating unit 10 does not include the trivet 60 (e.g., in embodiments where the countertop 40 is manufactured from a metal, metal alloy, ceramic material, etc.; in embodiments where the countertop 40 functions as a heating/cooling plate, etc.).

According to the exemplary embodiment shown in FIGS. 1-3, the temperature-regulating unit 10 is configured as a built-in appliance or other built-in temperature-regulating system (e.g., a stovetop appliance, built into a countertop, etc.). In other embodiments, the temperature-regulating unit 10 is configured as a portable, tabletop appliance (e.g., a portable induction range, a portable cooktop, a crockpot, etc.). In some embodiments, the temperature-regulating unit 10 is configured to heat or warm the pan 30 and/or food product using inductive heating. In some embodiments, the temperature-regulating unit 10 is configured to heat or warm the pan 30 and/or food product using non-inductive heating (e.g., conductive heating, convective heating, radiant heating, etc.). In some embodiments, the temperature-regulating unit 10 is configured to cool the pan 30 and/or food product. In some embodiments, the temperature-regulating unit 10 is configured as a dual heating and cooling system capable of heating and cooling the pan 30 and/or food product.

As shown in FIGS. 1-4, 5, and 6, the inductive sensing and control system 100 includes a temperature-regulating element, shown as thermal element 110, a sensor system, shown as inductive sensing assembly 120, and a control system, shown as controller 150, coupled to the thermal element 110 and the inductive sensing assembly 120. As shown in FIGS. 1-3, the thermal element 110 is configured to thermally regulate (e.g., heat, cool, etc.) the pan 30. As shown in FIGS. 1 and 2, the thermal element 110 is positioned adjacent the pan 30. As shown in FIG. 3, the thermal element 110 is separated from the pan 30 and positioned to thermally regulate the pan 30 through the countertop 40. In some embodiments, the thermal element 110 is additionally or alternatively configured to thermally regulate the countertop 40. In some embodiments, the thermal element 110 is or includes one or more heating elements (e.g., conductive heating elements, resistance heating elements, conduits that carry a heated working fluid, inductive heating elements, inductive heating coils, etc.). In some embodiments, the thermal element 110 is or includes one or more cooling elements (e.g., thermoelectric coolers, conduits that carry a cooled working fluid, Peltier devices, etc.). In some embodiments, the thermal element 110 includes one or more heating elements and one or more cooling elements. In some embodiments, the thermal element 110 is a dual functioning heating/cooling element (e.g., Peltier devices, conduits that carry a cooled or heated working fluid, etc.).

As shown in FIGS. 1-3, 5, and 6, the inductive sensing assembly 120 includes one or more sensing elements, shown as sensing coils 122, positioned within the internal cavity 22 of the housing 20 and a processor, shown as sensor processor 124, coupled to the sensing coils 122. As shown in FIGS. 1 and 2, the sensing coils 122 are separate from and independent of the thermal element 110. As shown in FIG. 3, the thermal element 110 and the sensing coil 122 are one in the same (e.g., an inductive heating coil that functions as both a heating element and the sensing coil 122, etc.). In other embodiments (e.g., embodiments where inductive heating is not used, etc.), the thermal element 110 and the sensing coil 122 in FIG. 3 are separate components.

Figure 5:
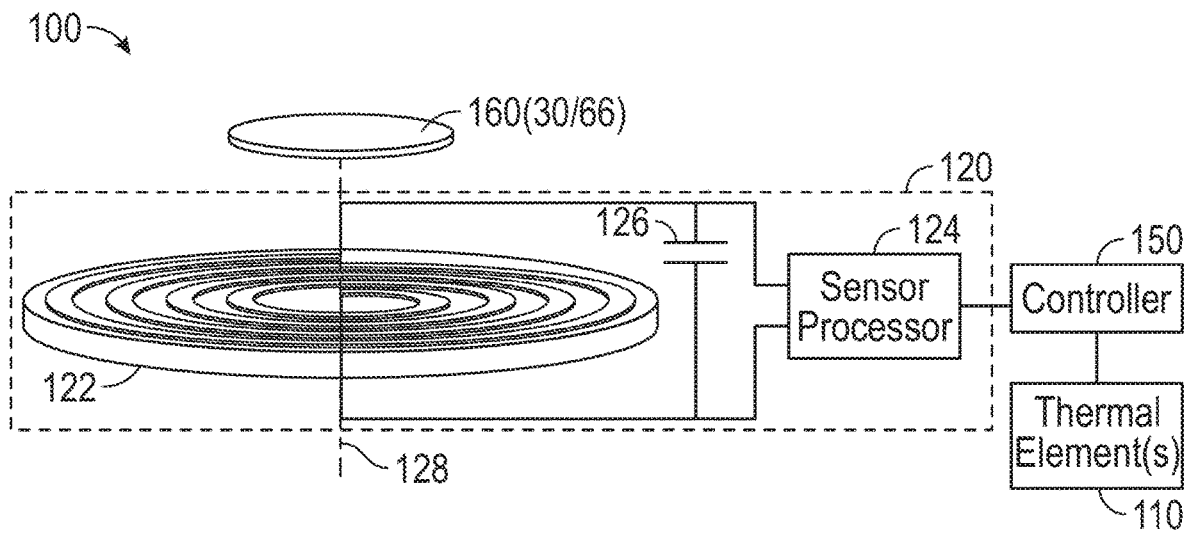
FIG. 5 is a schematic diagram of the contactless inductive sensing and control system of the temperature-regulating units of FIGS. 1-3, according to an exemplary embodiment.
Figure 6:
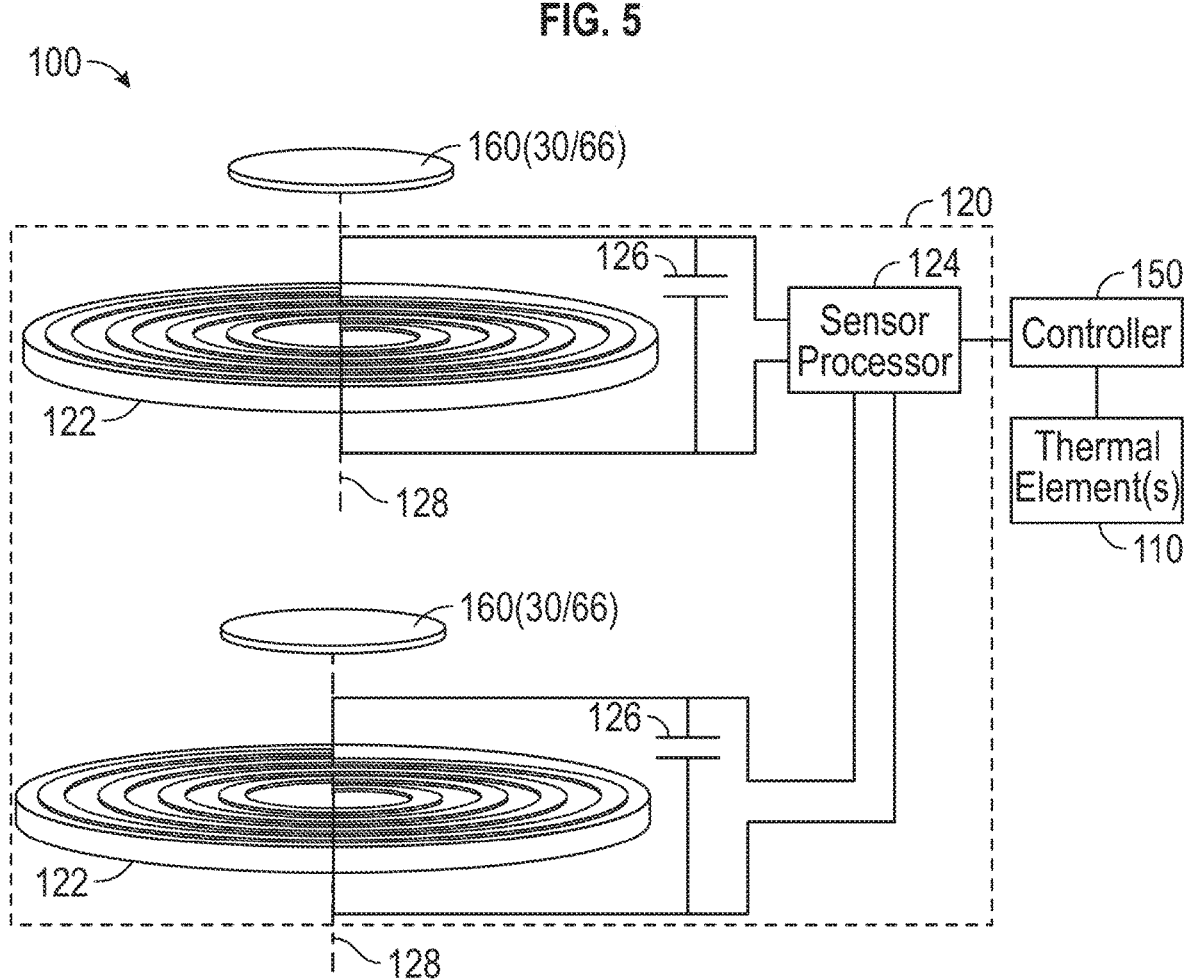
FIG. 6 is a schematic diagram of the contactless inductive sensing and control system of the temperature-regulating units of FIGS. 1-3, according to another exemplary embodiment.

As shown in FIGS. 5 and 6, the inductive sensing assembly 120 includes a capacitor, shown as capacitor 126, positioned between each of the the sensing coils 122 and the sensor processor 124. According to an exemplary embodiment, each set of sensing coils 122 and capacitors 126 form a resonant tank. According to an exemplary embodiment, the resonant tank have an intrinsic resonant frequency. According to an exemplary embodiment, the sensor processor 124 is configured to induce a current into the resonant tank and measure the resultant resonant frequency. According to an exemplary embodiment, such a process performed by the sensor processor 124 facilitates detecting (i) when a target object, shown as target 160, is proximate the sensing coil 122 and/or (ii) the temperature of the target 160. According to an exemplary embodiment, the target 160 is manufactured from an electrically conductive and/or magnetic material (e.g., cast iron, carbon steel, ferrous steel, non-ferrous steel, non-steel metals, etc.). As the target 160 is positioned closer to the sensing coil 122 and/or the temperature of the target 160 changes, the resonant frequency of the sensing coil 122 (i.e., the resonant tank) will change. According to an exemplary embodiment, the sensor processor 124 is configured to monitor the resonant frequency of the resonant tank to facilitate (i) detecting the presence of the target 160, (ii) detecting the position of the target 160 relative to a central axis, shown as axis 128, of the sensing coil 122, (iii) identifying the material of the target 160, and/or (iv) identifying the temperature of the target 160 (e.g., without touching the target 160, through the countertop 40, etc.). Accordingly, the inductive sensing assembly 120 is configured to facilitate detecting the presence, position, material, and/or temperature of the pan 30 and/or the trivet identifier 66.

The sensor processor 124 may be configured to continuously or periodically measure the resonant frequency of the sensing coil 122 and provides such information to controller 150. In practice, the frequency of the sensing coil 122 varies based on the location of the target 160. For example, if the target 160 is outside of a detection range of the sensing coil 122, the sensor processor 124 may report a frequency value equal to the intrinsic frequency of the sensing coil 122. If the target 160 is within the detection range of the sensing coil 122, the frequency of the sensing coil 122 will begin to change (e.g., increase, decrease, etc.). The change in frequency may be reported to the controller 150 by the sensor processor 124, signaling that the target 160 has been detected. The change in the measured frequency of the sensing coil 122 may be a function of the proximity of the target 160 to the axis 128 of the sensing coil 122. As the target 160 is moved towards a position that is aligned with the axis 128 of the sensing coil 122, the measured frequency will continue to change. Moreover, the size and/or material of the target 160 will also affect the frequency of the sensing coil 122. Accordingly, in addition to detecting the presence of the target 160 (e.g., the pan 30, the trivet identifier 66, etc.), the controller 150 may be configured to differentiate between different objects, such as between the trivet identifier 66 and the pan 30, as well as determine the size and/or the material of the target 160.

Further, the frequency of the sensing coil 122 varies based on the temperature of the target 160. Temperature feedback control is particularly useful in the context of food serving lines, where the pan 30 may need to be kept within a certain temperature range for food safety and/or quality. When the target 160 is present and being temperature controlled with the thermal element 110, the frequency of the sensing coil 122 will vary based on the change in the temperature of the target 160 (e.g., decrease as the temperature increases, etc.). The relationship between the temperature of the target 160 and the frequency of the sensing coil 122 may be stored in the controller 150 to facilitate achieving accurate temperature feedback and control.

Figure 7:
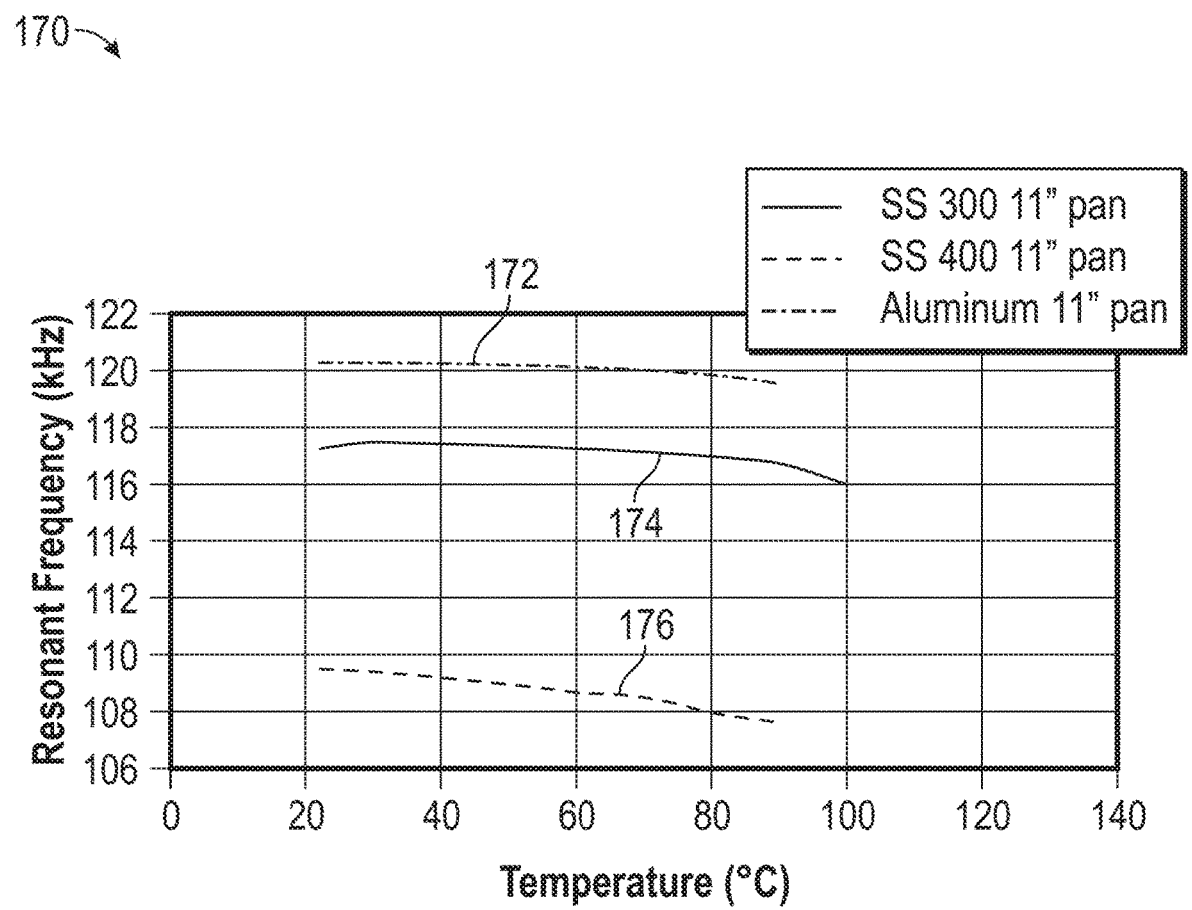
FIG. 7 is a graph depicting a change in a frequency sensed by a contactless inductive sensing assembly in response to a change in material and temperature of a target item, according to an exemplary embodiment.

As shown in FIG. 7, a graph 170 depicts various frequency/temperature profiles, shown as first frequency profile 172, second frequency profile 174, and third frequency profile 176, for various different targets 160 (e.g., pans 30, trivet identifiers 66, etc.). According to an exemplary embodiment, the first frequency profile 172 represents the resonant frequency of the resonant tank when the target 160 is manufactured from aluminum and as the target 160 increases in temperature from 20° C. to 90° C.; the second frequency profile 174 represents the resonant frequency of the resonant tank when the target 160 is manufactured from 300 series stainless steel and as the target 160 increases in temperature from 20° C. to 100° C.; and the third frequency profile 176 represents the resonant frequency of the resonant tank when the target 160 is manufactured from 400 series stainless steel and as the target 160 increases in temperature from 20° C. to 90° C. Accordingly, the inductive sensing assembly 120 facilitates (i) detecting different materials of the target 160 because the resonant frequency changes based on the material and (ii) detecting the temperature of the target 160 because the resonant frequency decreases as the temperature of the target 160 increases (or vice versa). While the graph 170 depicts frequency/temperature profiles for aluminum, 300 series stainless steel, and 400 series stainless steel, it should be understood that the inductive sensing and control system 100 may be configured to detect and identify the presence, position, material, and/or temperature of various targets 160 manufactured from various other electrically conductive materials, magnetic materials, and/or still other materials (e.g., cast iron, ferrous steels, non-ferrous steels, copper, aluminum, etc.).

According to an exemplary embodiment, the controller 150 is configured to control the thermal element 110 based on the resonant frequency measurements acquired by the inductive sensing assembly 120. Further details regarding the functions of and operations performed by the controller 150 is provided herein with regards to FIGS. 8-10.

The controller 150 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. The controller 150 may include a processing circuit having a processor and a memory. The processing circuit may include an ASIC, one or more FPGAs, a DSP, circuits containing one or more processing components, circuitry for supporting a microprocessor, a group of processing components, or other suitable electronic processing components. The processor may be configured to execute computer code stored in the memory to facilitate the activities described herein. The memory may be any volatile or non-volatile computer-readable storage medium capable of storing data or computer code relating to the activities described herein. The memory may include computer code modules (e.g., executable code, object code, source code, script code, machine code, etc.) configured for execution by the processor.

Figure 8:
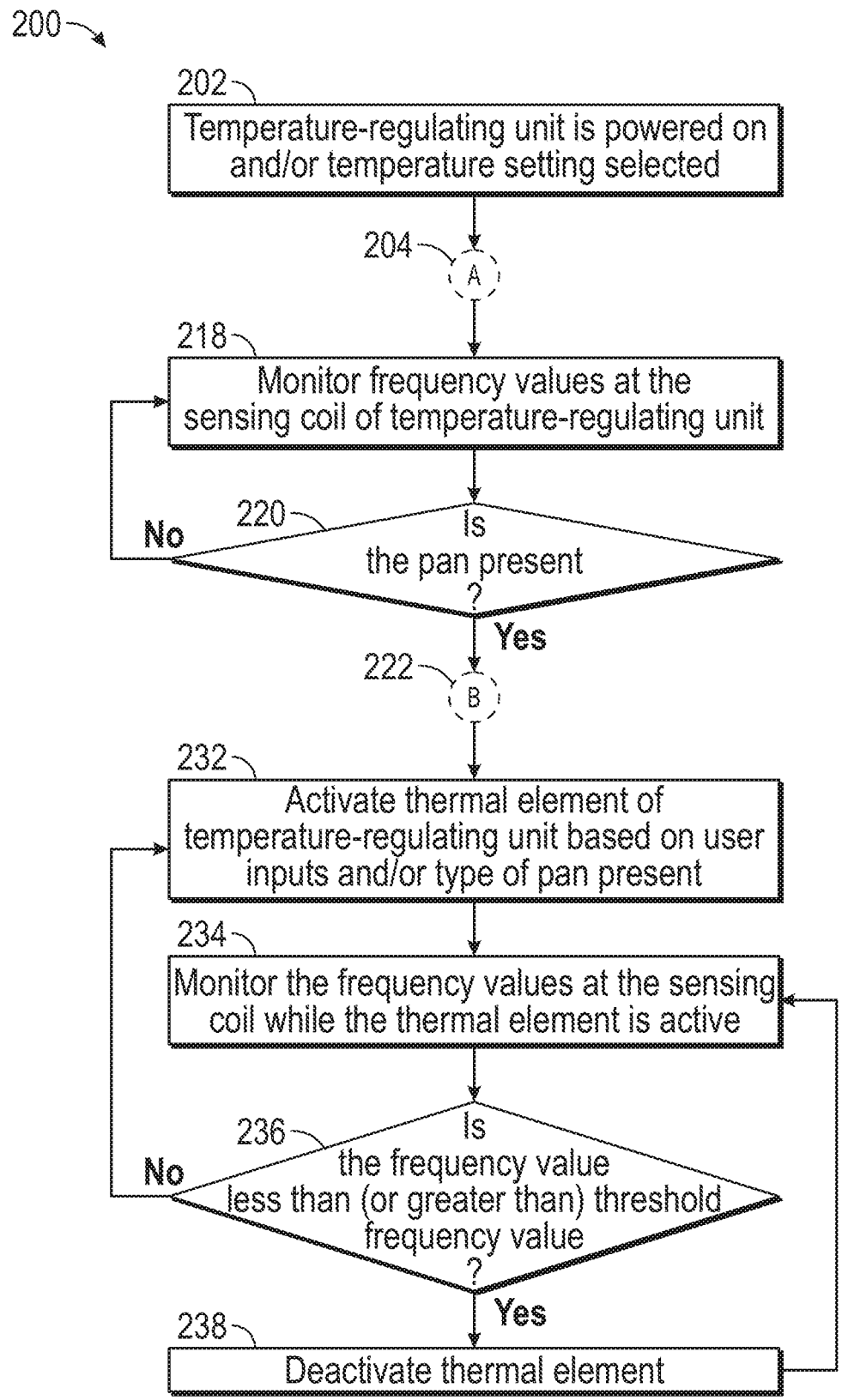
FIGS. 8-10 show a method for controlling a temperature-regulating unit based on data acquired by an inductive sensing assembly, according to an exemplary embodiment.
Figure 9:
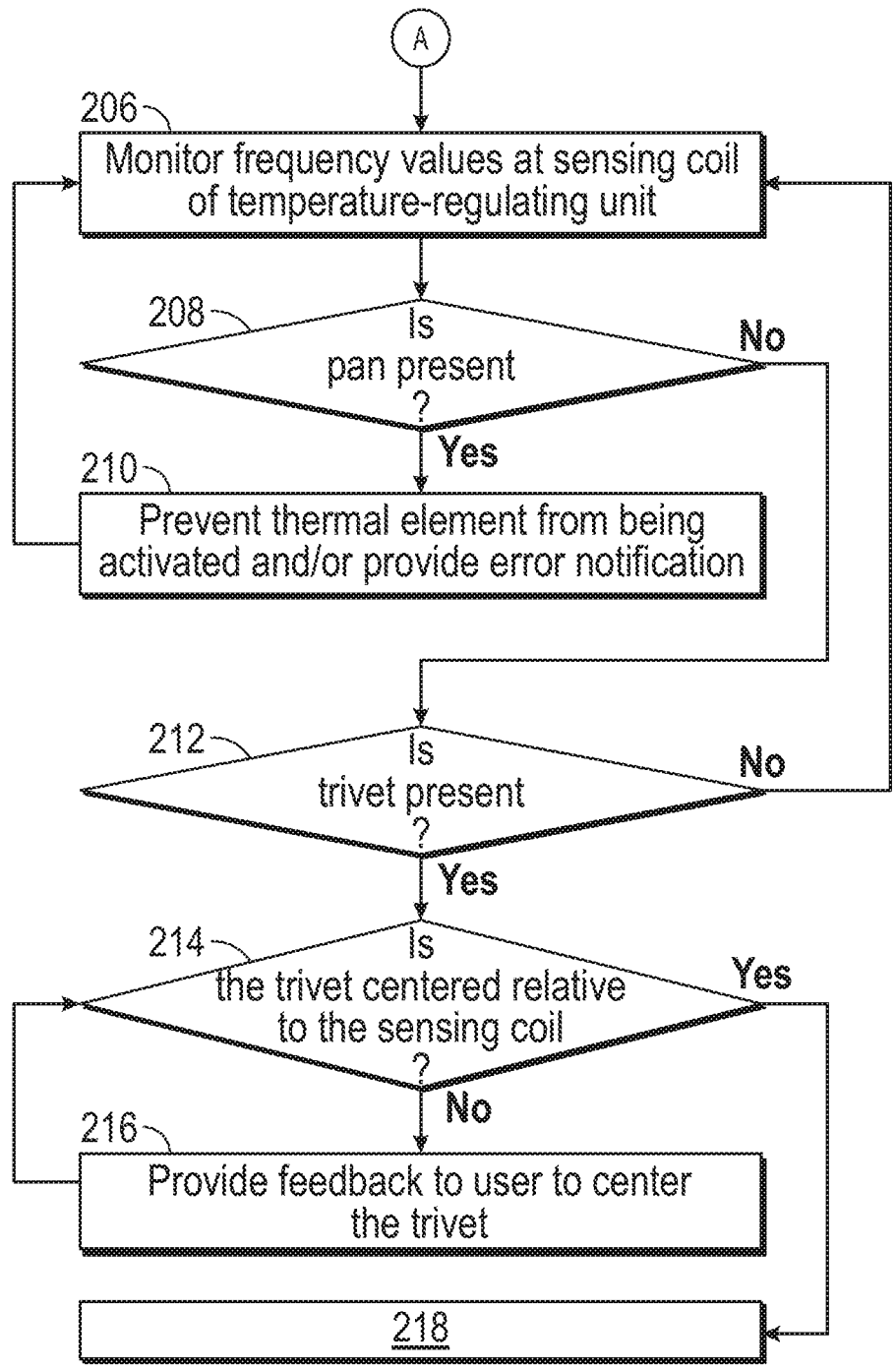
Figure 10:
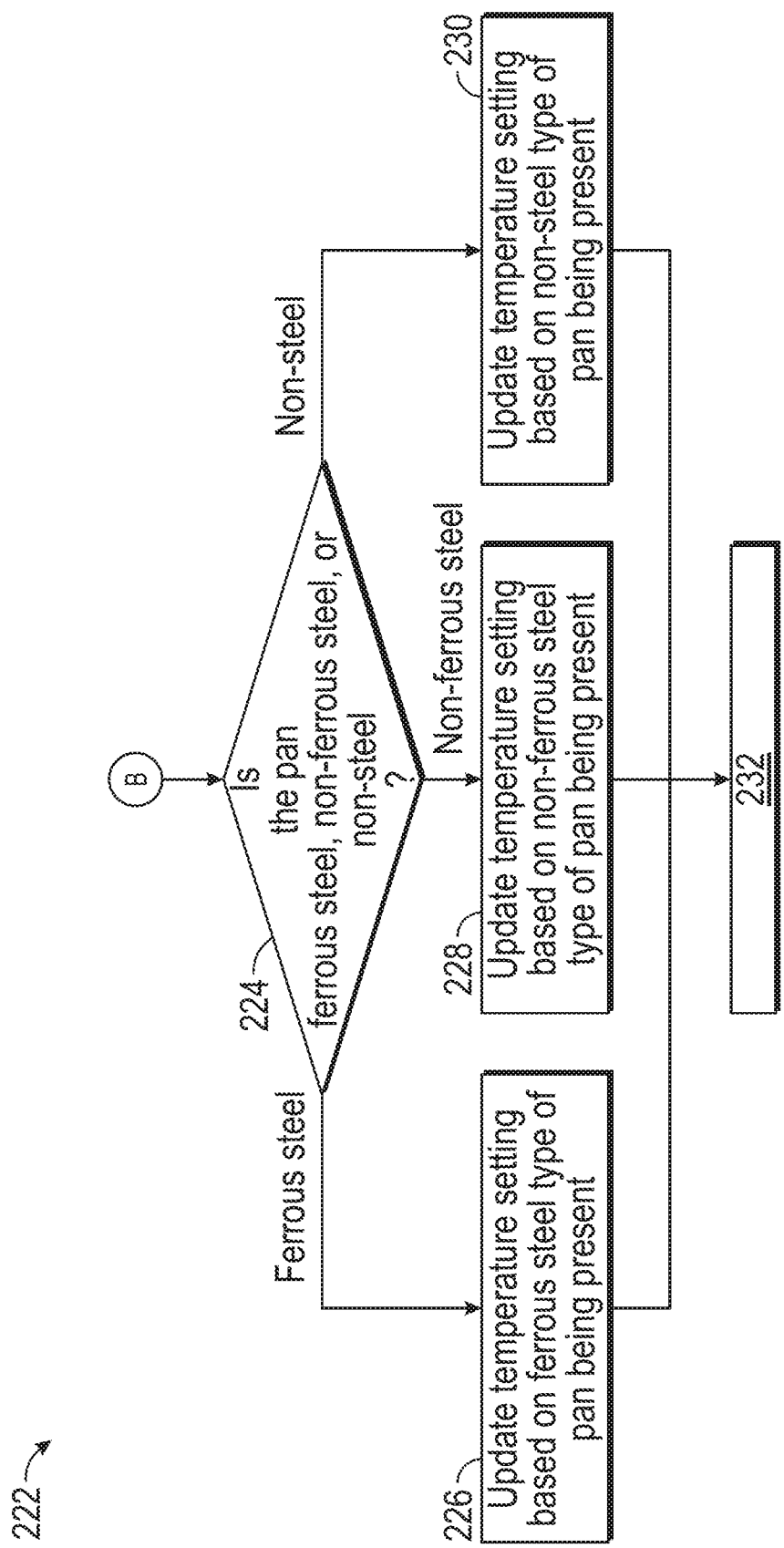
Figure 11:
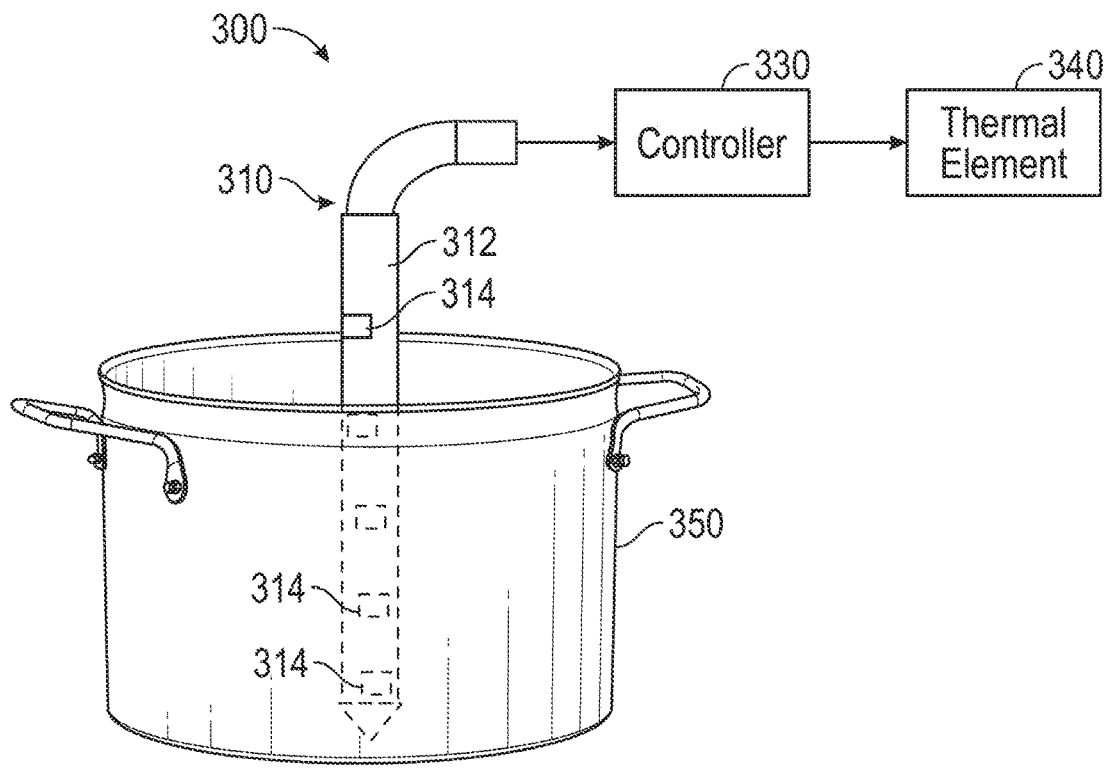
FIGS. 11-15 are various views of a multi-zone temperature sensing probe system, according to various exemplary embodiments.

Referring now to FIGS. 8-10, a method 200 for controlling the temperature-regulating unit 10 based on data acquired by the inductive sensing assembly 120 is shown, according to an exemplary embodiment. At step 202, the temperature-regulating unit 10 is powered on and/or a temperature setting is selected (e.g., by an operator using a user interface of the temperature-regulating unit 10, etc.). Next, an optional sub-method 204 (steps 206-216) may be performed (e.g., in embodiments where the temperature-regulating unit 10 includes the trivet 60, etc.). At step 206, the controller 150 is configured to monitor frequency values at the sensing coil 122 of the temperature-regulating unit 10 (e.g., acquired by the sensor processor 124, etc.).

At step 208, the controller 150 is configured to determine if the pan 30 is present based on the frequency values at the sensing coil 122 (e.g., frequency values associated with the pan 30 at room temperature, etc.). If the pan 30 is detected (without the trivet 60), at step 210, the controller 150 is configured to (i) prevent the thermal element 110 from being activated (e.g., to prevent damage to the countertop 40, etc.) and/or (ii) provide an error notification (e.g., an audible message, illuminate a visual indicator, etc.) indicating that the pan 30 is present without the trivet 60. If the pan 30 is not detected, at step 212, the controller 150 is configured to determine if the trivet 60 is present based on the frequency values at the sensing coil 122 (e.g., frequency values associated with the trivet 60 at room temperature, etc.). If the controller 150 does not detect the trivet 60, the controller 150 is configured to return to step 206. If the controller 150 detects the trivet 60, the controller 150 is configured to proceed to step 214.

At step 214, in response to detecting the trivet 60, the controller 150 is configured to determine whether the trivet 60 is centered relative to the axis 128 of the sensing coil 122. If the trivet 60 is not centered about the axis 128, the controller 150 is configured to proceed to step 216. At step 216, the controller 150 is configured to provide feedback to the user to center the trivet 60. In some embodiments, the controller 150 is configured to control a visual indicator whose output informs the user (e.g., via an alphanumeric output, progress-style indicator, etc.) of the proximity of the trivet 60 to the center of the sensing coil 122. In some embodiments, the controller 150 is configured to control a speaker to provide an audible indication of the proximity of the trivet 60 to the center of the sensing coil 122. Once the trivet 60 is centered, the controller 150 is configured to proceed to step 218.

At step 218, the controller 150 is configured to monitor the frequency values at the sensing coil 122 of the temperature-regulating unit 10 (e.g., acquired by the sensor processor 124, etc.). At step 220, the controller 150 is configured to determine if the pan 30 is present based on the frequency values at the sensing coil 122 (e.g., frequency values associated with the pan 30 at room temperature, etc.). If the pan 30 is not detected, the controller 150 is configured to return to step 218 until the pan 30 is detected. If the pan 30 is detected (with the trivet 60 or without the trivet 60), the controller 150 is configured to proceed to an optional sub-method 222 (steps 224-230). At step 224, the controller 150 is configured to determine the material composition of the pan 30 based on the frequency values at the sensing coil 122. By way of example, the controller 150 may be configured to identify whether the pan 30 is manufactured from ferrous steel (e.g., cast iron, etc.), non-ferrous steel (e.g., carbon steel, stainless steel, etc.), or non-steel materials (e.g., copper, aluminum, etc.). In some embodiments, the controller 150 is configured to identify subclasses within the three groupings above. For example, for non-steel pans, the controller 150 may be configured to distinguish between copper pans, aluminum pans, etc. At steps 226-230, the controller 150 is configured to update the temperature setting based on the type of pan identified at step 224 (e.g., to more accurately control the thermal element 110 and therefore the temperature of the pan 30 based on the material composition thereof, etc.).

At step 232, the controller 150 is configured to activate the thermal element 110 of the temperature-regulating unit 10 based on user inputs (e.g., the user selected temperature setting at step 202, etc.) and/or the type of material of the pan 30 present (e.g., updated temperature setting determined using sub-method 222, etc.). At step 218, the controller 150 is configured to monitor the frequency values at the sensing coil 122 of the temperature-regulating unit 10 while the thermal element 110 is active (e.g., heating the pan 30, cooling the pan 30, etc.). Monitoring the frequency values at the sensing coil 122 facilitates monitoring the temperature change of the pan 30. At step 236, the controller 150 is configured to determine if the frequency value at the sensing coil 122 is less than (or alternatively, greater than) a threshold frequency value. By way of example, the threshold frequency value may correspond a maximum temperature (or alternatively, a minimum temperature) of the pan 30. If the frequency value has not yet reached the threshold frequency value, the controller 150 is configured to return to step 232 and continue heating (or alternatively, cooling) the pan 30 with the thermal element 110. If the threshold frequency value has been reached, at step 238, the controller 150 is configured to deactivate the thermal element 110 to stop heating (or alternatively, cooling) the pan 30 until the frequency value increases (or alternatively, decreases). Accordingly, the frequency values at the sensing coil 122 facilitate (i) detecting the presence of the trivet 60, the position of the trivet 60 relative to the axis 128, the presence of the pan 30, the material composition of the pan 30, and/or the temperature of the pan 30 and (ii) providing accurate temperature control of the pan 30 via the thermal element 110.

Multi-Zone Temperature Sensing Probe

According to the exemplary embodiments shown in FIGS. 11-15, a temperature-regulating system, shown as temperature-regulating system 300, includes a temperature sensing device, shown as temperature sensing probe 310; a control system, shown as controller 330, coupled to the temperature sensing probe 310; and a temperature-regulating element, shown as thermal element 340, positioned to thermally regulate a temperature of a food vessel (e.g., a pan, a pot, a warming pan, a soup well, a heating plate, a cooling plate, etc.), shown as food container 350, and/or a food product (e.g., liquids, solids, soup, stew, meat, etc.), shown as food product 352.

As shown in FIGS. 11-15, the temperature sensing probe 310 includes an elongated body, shown as probe body 312, having a plurality of temperature sensing elements, shown as temperature sensors 314, positioned within and/or along the length of the probe body 312. According to an exemplary embodiment, the probe body 312 is configured to be immersed within or introduced into the food product 352 to acquire temperature data regarding the food product 352. The temperature sensors 314 may be or include thermistors, thermocouples, resistance temperature detection (RTD) sensors, negative temperature coefficient (NTC) thermistors, any other suitable temperature sensor, or any combination thereof. According to an exemplary embodiment, the temperature sensors 314 are spaced along the probe body 312 at various preselected positions to facilitate detecting the temperature at various depths of the food product 352 and, thereby, facilitate determining (i) a depth, level, or thickness of the food product 352 (e.g., within the food container 350, outside of a food container, etc.) and/or (ii) a temperature gradient across the depth or thickness thereof.

Figure 12:
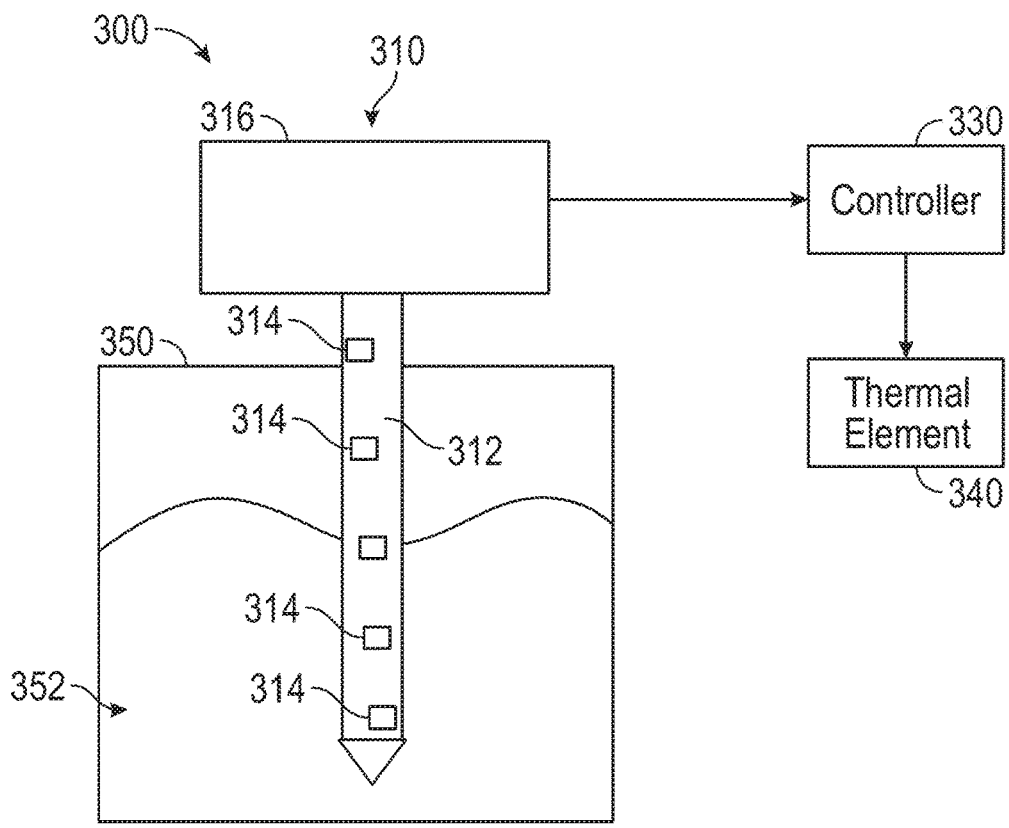
Figure 13:
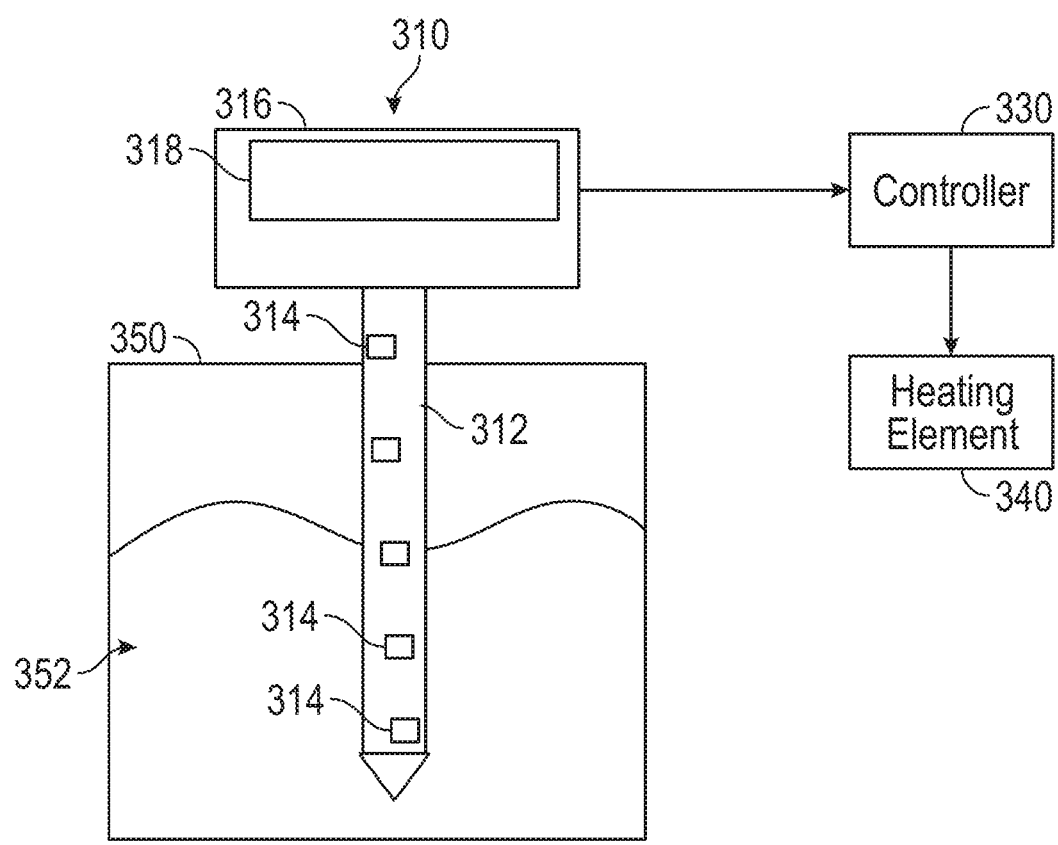
Figure 14:
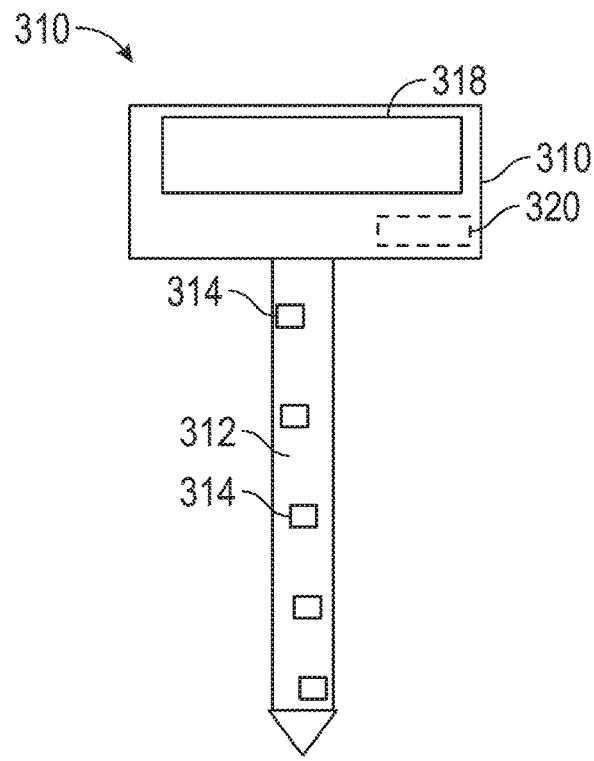

As shown in FIGS. 12-14, the temperature sensing probe 310 includes a housing, shown as probe head 316, coupled to an end of probe body 312 such that the probe body 312 extends from the probe head 316. The probe head 316 may be configured to function as a handle for a user to manipulate the temperature sensing probe 310. According to the exemplary embodiment shown in FIGS. 11-15, the probe body 312 and the probe head 316 are shaped like that of traditional temperature sensing probes. In other embodiments, the probe body 312 and/or the probe head 316 are otherwise shaped. By way of example, the temperature sensing probe 310 may be shaped like a cooking utensil such as a ladle, a spoon, a serving fork, etc. In some embodiments, the probe body 312 includes a stirring fin or blade that facilitates stirring or mixing the food product 352 within the food container 350. In some embodiments, the temperature sensing probe 310 does not include the probe head 316. In such embodiments, probe body 312 may be directly coupled to (e.g., integrated into, etc.) and/or selectively couplable to (e.g., detachable from, etc.) a lid or cover of the food container 350.

As shown in FIGS. 13 and 14, the temperature sensing probe 310 includes an interface, shown as user interface 318, disposed along the probe head 316. In other embodiments, the user interface 318 is a remote interface connected to the temperature sensing probe 310 via a wired or wireless connection. According to an exemplary embodiment, the user interface 318 includes a display configured to provide feedback to an operator. For example, the user interface 318 may provide feedback related to a temperature, a temperature gradient, a depth, and/or a thickness of the food product 352. In some embodiments, the user interface 318 facilitates providing instructions to the user (e.g., to adjust the temperature of the thermal element 340, to stir or mix the food product 352, to add an ingredient to the food product. In some embodiments, the user interface 318 of the temperature sensing probe 310 includes input devices (e.g., buttons, touch screen, etc.) to facilitate providing commands to the controller 330 (e.g., a timer, a temperature setting, a food type input, etc.). In other embodiments, the controller 330 includes the display and/or the input devices.

Figure 15:
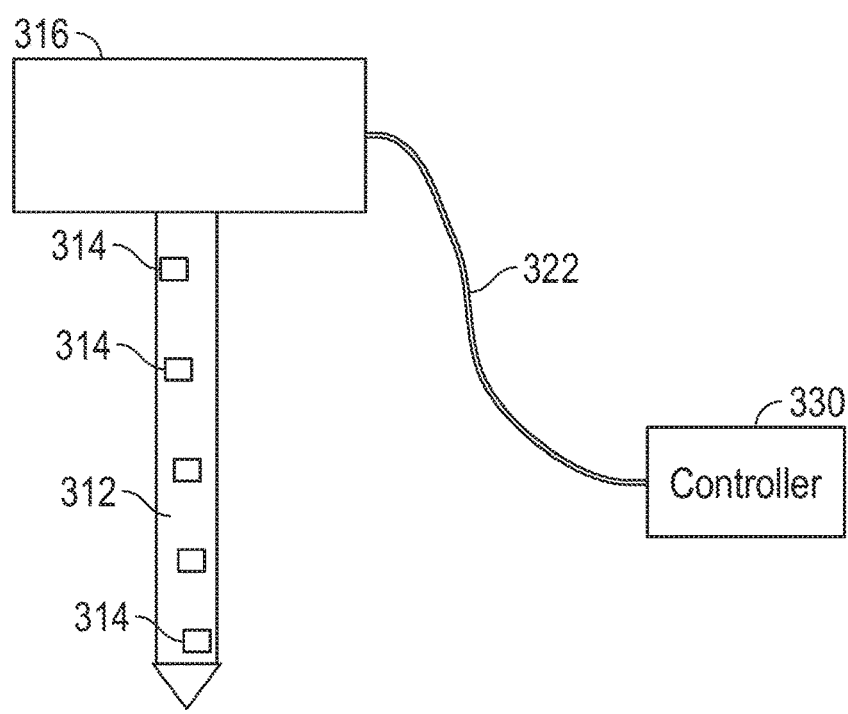

As shown in FIG. 14, the temperature sensing probe 310 includes a wireless communications device, shown as wireless transmitter 320. According to an exemplary embodiment, the wireless transmitter 320 is configured to facilitate wirelessly transmitting (e.g., via Bluetooth, Wi-Fi, NFC, ZigBee, etc.) the temperature data acquired by the temperature sensors 314 to the controller 330. As shown in FIG. 15, the temperature sensing probe 310 includes a connector, shown as wired connector 322, extending from the probe head 316 to the controller 330. In some embodiments, the wired connector 322 is detachable from the probe head 316 and/or the controller 330. According to an exemplary embodiment, the wired connector 322 is configured to facilitate transmitting the temperature data acquired by the temperature sensors 314 to the controller 330. While shown as independent components of the temperature-regulating system 300, in some embodiments, the controller 330 is integrated into the temperature sensing probe 310 (e.g., the probe head 316, etc.).

In some embodiments, the thermal element 340 is configured as a heating element. In one embodiment, the heating element is configured as an inductive heating element (e.g., an inductive heating coil, etc.) positioned to facilitate cooking, heating, and/or warming the food container 350 and/or the food product 352 via inductive heating. In other embodiments, the thermal element 340 is configured as a non-inductive heating element (e.g., a conductive heating coil, a radiant heater, etc.) positioned to facilitate cooking, heating, and/or warming the food container 350 and/or the food product 352 via conductive, radiant, and/or convective heating. In some embodiments, the thermal element 340 is additionally or alternatively configured as cooling element (e.g., a Peltier device, a thermoelectric cooler, etc.) positioned to facilitate cooling the food container 350 and/or the food product 352 via conductive and/or convective cooling.

The controller 330 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. The controller 330 may include a processing circuit having a processor and a memory. The processing circuit may include an ASIC, one or more FPGAs, a DSP, circuits containing one or more processing components, circuitry for supporting a microprocessor, a group of processing components, or other suitable electronic processing components. The processor may be configured to execute computer code stored in the memory to facilitate the activities described herein. The memory may be any volatile or non-volatile computer-readable storage medium capable of storing data or computer code relating to the activities described herein. The memory may include computer code modules (e.g., executable code, object code, source code, script code, machine code, etc.) configured for execution by the processor. In some embodiments, the controller 330 is integrated into a user's portable device (e.g., laptop, tablet, smartphone, etc.) that runs an application associated with the temperature sensing probe 310.

In some embodiments, the controller 330 is configured to determine a level or depth of the food product 352 (e.g., liquid, soup, stew, etc.) within the food container 350 based on the temperature at each of the temperature sensors 314 positioned along the length of the probe body 312. By way of example, only a portion of the probe body 312 may be immersed within the food product 352 such that one or more of the temperature sensors 314 may be surrounded by the food product 352 and the remaining temperature sensors 314 may not be surrounded by the food product 352 (e.g., positioned above the food product 352, etc.). The temperature sensors 314 at an elevated temperature may indicate that such sensors are within the food product 352 and the temperature sensors 314 at a lower temperature may indicate that such sensors are above the food product 352. Accordingly, the controller 330 may be configured to determine the level or depth of the food product 352 based on a known relationship (e.g., distance, etc.) between the temperature sensors 314, a known length of the probe body 312, and/or the temperature at each of the temperature sensors 314.

In some embodiments, the controller 330 is configured to determine a thickness of the food product 352 (e.g., meat, a roast, prime rib, etc.) based on the temperature at each of the temperature sensors 314 positioned along the length of the probe body 312. Because the food product 352 may have a temperature gradient therethrough, the temperature sensors 314 positioned proximate the outer edges of the food product 352 may be at an elevated temperature relative to the temperature sensors 314 at the middle or interior of the food product 352. Accordingly, the controller 330 may be configured to determine the thickness the food product 352 based on a known relationship (e.g., distance, etc.) between the temperature sensors 314 and an identification of which of the temperature sensors 314 are proximate the outer edges of the food product based on the temperature data (i.e., determine the distance between the two temperature sensors associated with the outer edges of the food product 352).

According to an exemplary embodiment, the controller 330 is configured to control operation of the thermal element 340 based on (i) user commands provided by a user via the user interface 318 and/or (ii) sensor feedback signals received from temperature sensing probe 310 (e.g., temperature measurements, etc.) to thermally regulate and maintain the food container 350 and/or the food product 352 at a desired temperature. In some embodiments, the controller 330 is configured to control the thermal element 340 based on the depth, level, or thickness of the food product 352 and/or a temperature gradient of the food product 352. By way of example, the controller 330 may be configured to deactivate the thermal element 340 in response to the temperature of the food product 352 reaching a desired temperature (e.g., a desired serving temperature; an amount cooked such as rare, medium, well-done, etc.; etc.). By way of another example, the controller 330 may be configured to activate a portion of the thermal element 340 to increase or decrease a temperature along a portion of the food container 350 (e.g., to prevent hot spots or cold spots within the food container 350, etc.).

In some embodiments, the controller 330 is configured to provide feedback, commands, or instructions to the user based on the temperature data. By way of example, the controller 330 may be configured to provide an instruction to the user (e.g., via the user interface 318, on a display of the controller 330, on a user's portable device, etc.) to mix the food product 352 (e.g., in response to non-uniform temperature distribution within the food product 352, etc.). By way of another example, the controller 330 may be configured to provide an instruction to the user to manually increase or decrease the temperature of the thermal element 340. By way of still another example, the controller 330 may be configured to provide an instruction to the user to add an ingredient to the food product 352 (e.g., adding an ingredient once a certain temperature is reached, because the additional ingredient requires less cooking time, etc.).

Figure 16:
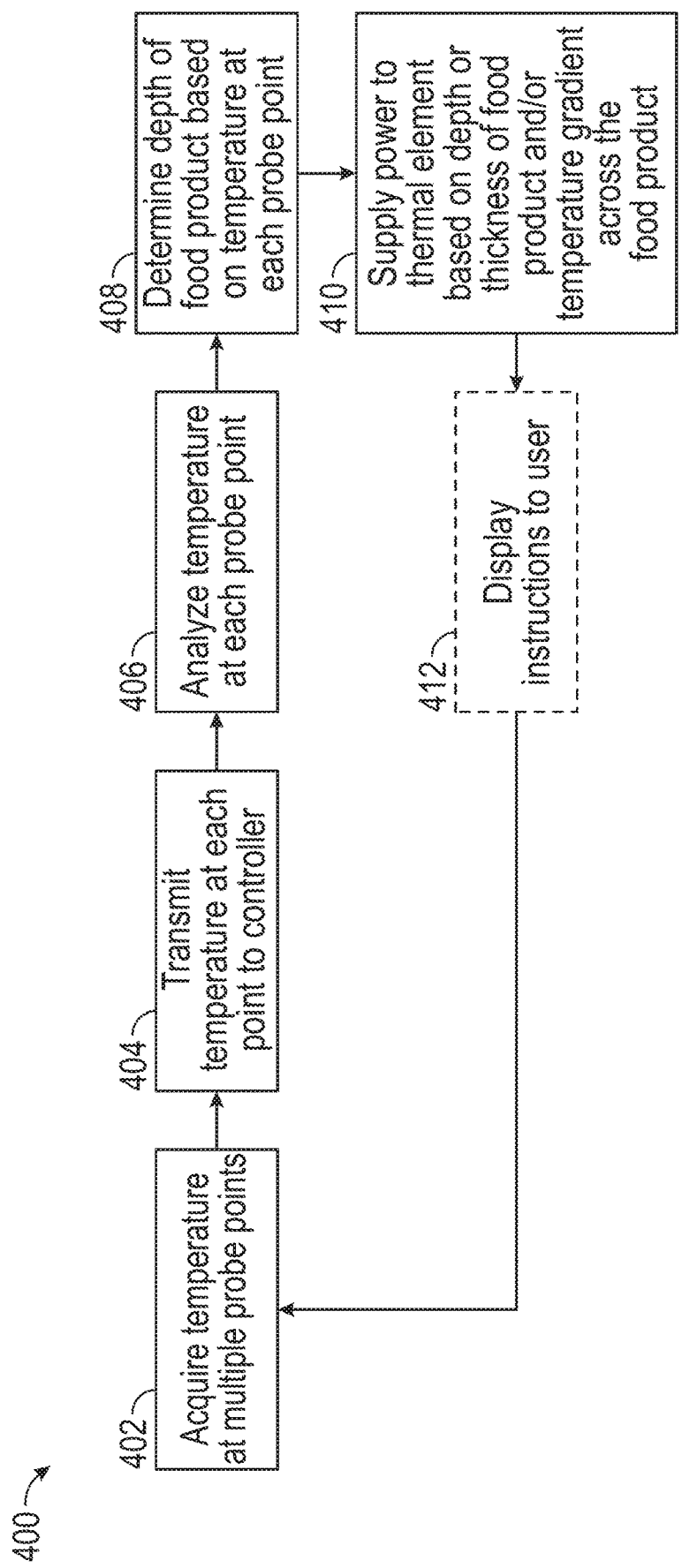
FIG. 16 is a method for controlling a temperature-regulating system based on data acquired by a multi-zone temperature sensing probe, according to an exemplary embodiment.

Referring now to FIG. 16, a method 400 for controlling a temperature-regulating system (e.g., the temperature-regulating system 300, etc.) based on data acquired by a multi-zone temperature sensing probe (e.g., the temperature sensing probe 310, etc.) is shown, according to an exemplary embodiment. At step 402, the multi-zone temperature sensing probe is configured to acquire temperature data regarding a temperature of a food product at multiple probe points with a plurality of temperature sensors (e.g., the temperature sensors 314, etc.) positioned along the multi-zone temperature sensing probe (e.g., the probe body 312, etc.). At step 404, the multi-zone temperature sensing probe is configured to transmit the temperature data at each point to a controller (e.g., the controller 330, etc.). In some embodiments, the multi-zone temperature sensing probe transmits the temperature data wirelessly (e.g., via the wireless transmitted 320, etc.) to the controller. In some embodiments, the multi-zone temperature sensing probe transmits the temperature data to the controller via a wired connection (e.g., the wired connector 322, etc.). In some embodiments, the controller is integrated into the multi-zone temperature sensing probe.

At step 406, the controller is configured to analyze the temperature at each probe point. At step 408, the controller is configured to determine depth or level of the food product (e.g., within the food container 350, etc.) or a thickness of the food product based on the temperature at each probe point. At step 408, the controller is configured to supply power to a thermal element (e.g., the thermal element 340, etc.) based on the depth, level, or thickness of the food product and/or a temperature gradient across the food product. In other embodiments, the controller provides feedback to a user to manually adjust the temperature of the thermal element. At step 412, the controller is configured to display instructions (e.g., mix, adjust temperature, add ingredients, etc.) and/or feedback (e.g., current temperature, food is ready, etc.) to the user (e.g., on an independent display, on the user interface 318, on a display of the controller, on a user's portable device, etc.).

Contactless Infrared Sensing and Control System

According to the exemplary embodiments shown in FIGS. 17-20, a temperature-regulating system, shown as temperature-regulating unit 500, includes a contactless sensing system, shown as sensing system 520. In some embodiments, the sensing system 520 is used with or in place of the inductive sensing assembly 120. As shown FIGS. 17-20, the temperature-regulating unit 500 includes a body, enclosure, or housing, shown as base 502; a support structure, shown as overhead support 504, extending from the base 502; one or more thermal elements, shown as thermal elements 508; and a control system, shown as controller 510, coupled to the thermal elements 508 and the sensing system 520. In some embodiments, the temperature-regulating unit 500 does not include the overhead support 504.

As shown in FIGS. 17-20, the base 502 of the temperature-regulating unit 500 is configured to receive, hold, or otherwise support one or more items of cookware (e.g., a tray, a pan, a pot, etc.), shown as pans 530, and/or food product. In various embodiments (e.g., embodiments where the temperature-regulating unit 500 includes inductive thermal elements, etc.), the pan 530 is an electrically conductive and/or magnetic pan manufactured from a material such as cast iron, carbon steel, magnetic stainless steel, and/or any other material suitable for use with an induction heating system. In other embodiments (e.g., embodiments where the temperature-regulating unit 500 includes non-inductive thermal elements, etc.), the pan 30 is manufactured from a non-electrically conductive or non-magnetic material such as ceramics, porcelain, non-magnetic metals, etc.

The temperature-regulating unit 500 may be configured as a hot and/or cold well, a soup well, a surface temperature-regulating unit (e.g., an induction range, a cooktop, a cooling countertop, etc.), a radiant heating unit, and/or still other suitable temperature-regulating units. In some embodiments, the temperature-regulating unit 500 is configured as a built-in appliance or other built-in temperature-regulating system (e.g., a stovetop appliance, an oven, a conveyor toaster, built into a countertop, etc.). In some embodiments, the temperature-regulating unit 500 is configured to a stand-alone unit (e.g., a serving line unit, a buffet unit, a conveyor toaster, etc.) (see, e.g., FIGS. 17 and 18). In some embodiments, the temperature-regulating unit 500 is configured as a portable, tabletop appliance (e.g., a portable induction range, a portable cooktop, a toaster oven, etc.) (see, e.g., FIG. 19).

Figure 17:
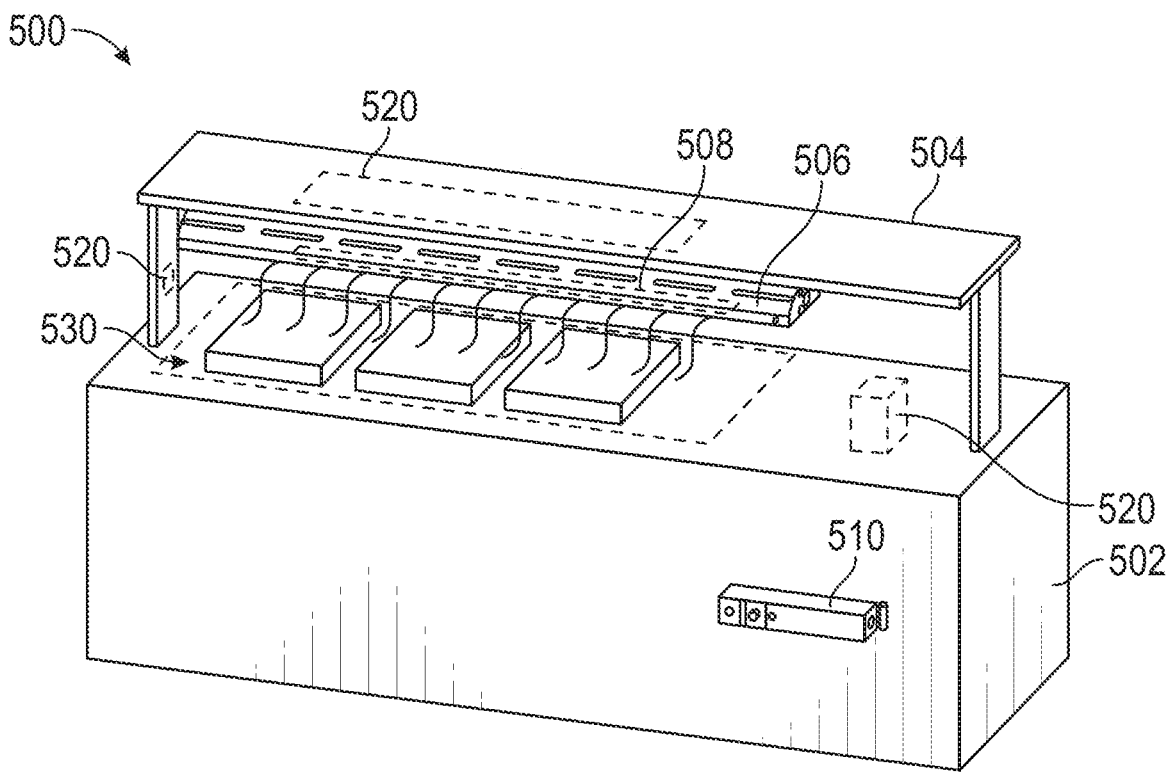
FIGS. 17-20 are various views of a temperature-regulating unit having a contactless infrared sensing and control system, according to various exemplary embodiments.
Figure 18:
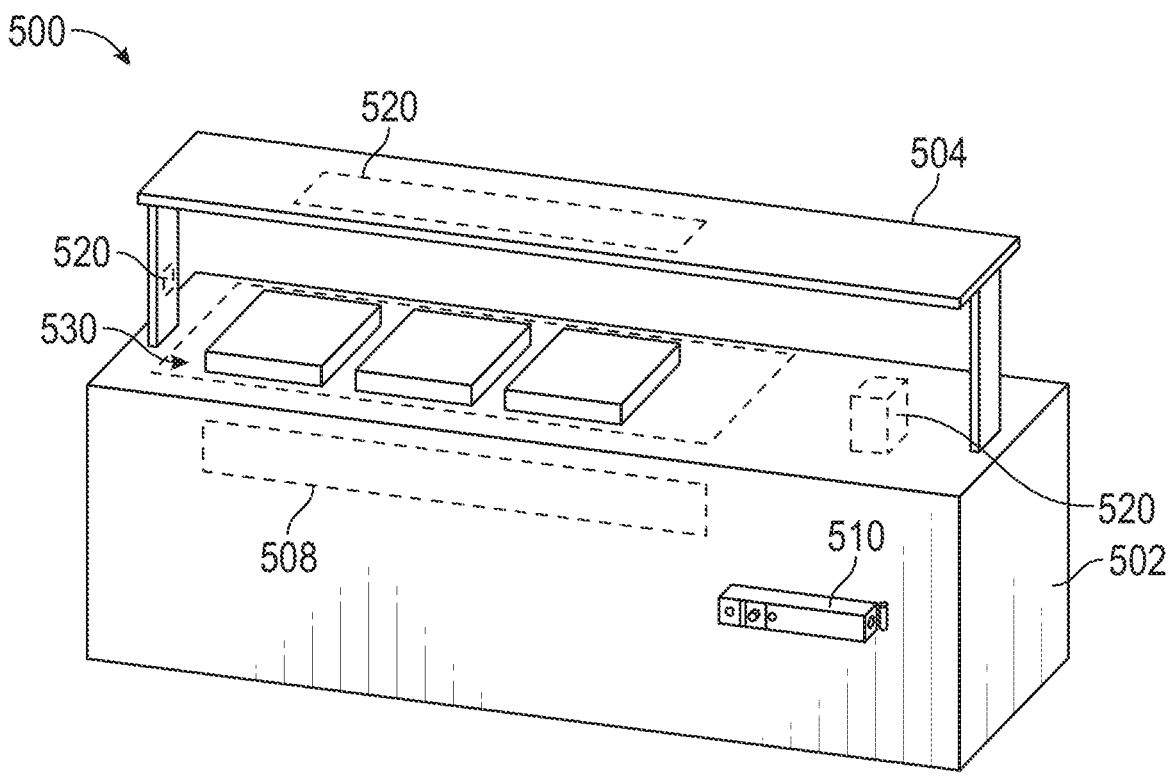
Figure 19:
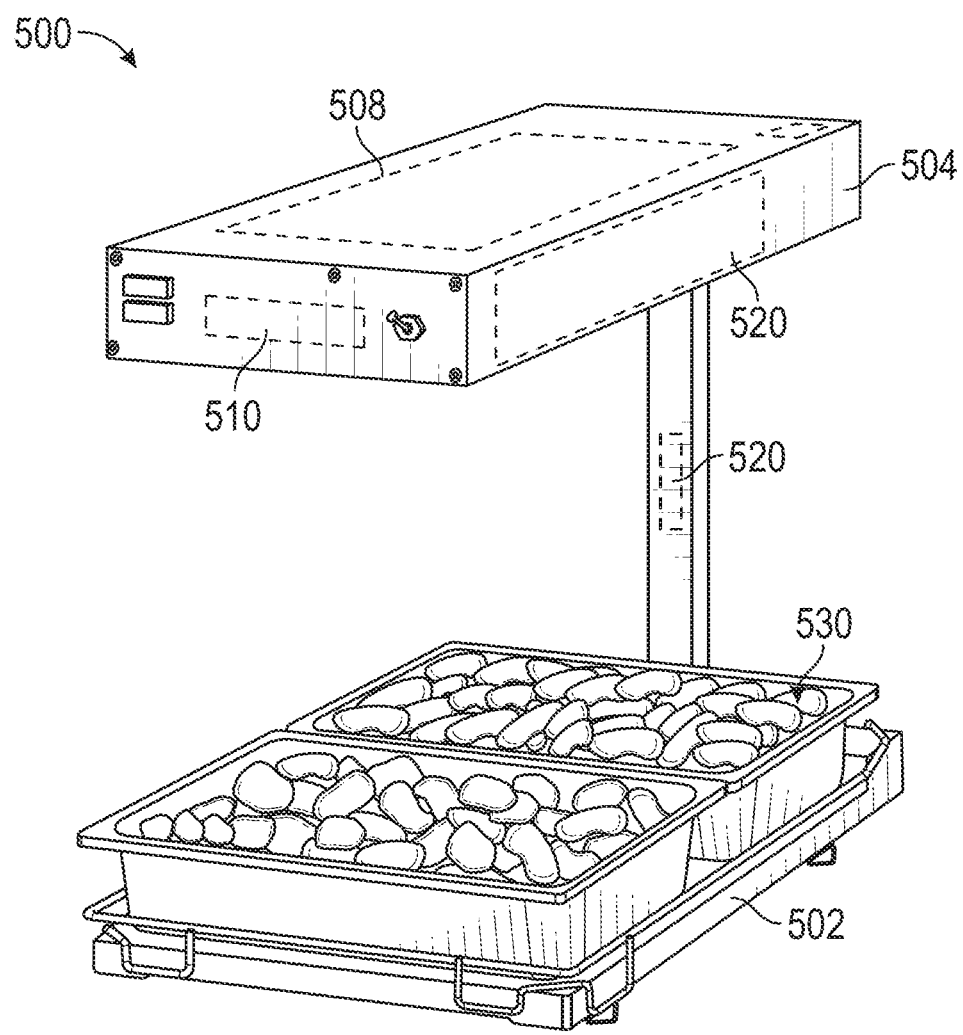

As shown in FIGS. 17 and 19, the temperature-regulating unit 500 includes a radiant heat lamp, shown as heat lamp 506, coupled to the overhead support 504 above the pans 530 and configured to house the thermal element 508. As shown in FIG. 18, the thermal element 508 is disposed within the base 502 and positioned beneath the pans 530. In some embodiments, the thermal element 508 is or includes one or more heating elements (e.g., conductive heating elements, resistance heating elements, conduits that carry a heated working fluid, inductive heating elements, inductive heating coils, etc.). In some embodiments, the thermal element 508 is or includes one or more cooling elements (e.g., thermoelectric coolers, conduits that carry a cooled working fluid, Peltier devices, etc.). In some embodiments, the thermal element 508 includes one or more heating elements and one or more cooling elements. In some embodiments, the thermal element 508 is a dual functioning heating/cooling element (e.g., Peltier devices, conduits that carry a cooled or heated working fluid, etc.).

Figure 20:
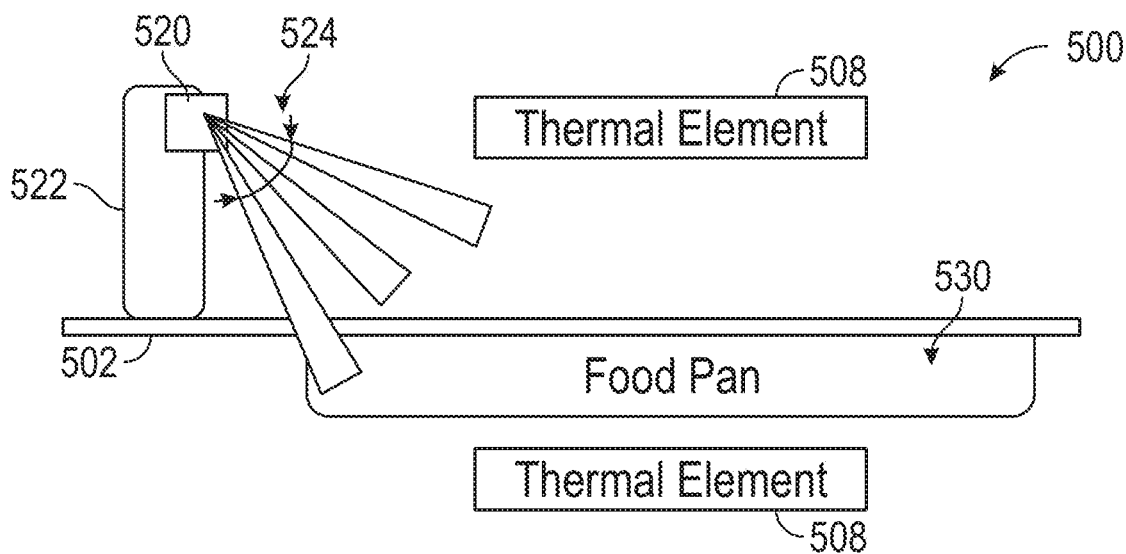

As shown in FIGS. 17-20, the sensing system 520 can be variously positioned about the temperature-regulating unit 500, so long as the sensing system 520 has a line of sight to the pans 530 and/or the food product. Specifically, the sensing system 520 may be coupled or positioned along the base 502 and/or the overhead support 504. In some embodiments, the sensing system 520 includes a plurality of infrared (IR) sensors (e.g., IR detectors, IR scanners, etc.) and/or scanning devices (e.g., photodetectors, cameras, etc.) configured to acquire data regarding the pans 530 and/or the food product. In some embodiments, the sensing system 520 includes a single IR sensor and/or scanner configured to acquire data regarding each of the pans 530 and/or the food product. As shown in FIG. 20, the sensing system 520 includes a sensor support, shown as sensor post 522, that is coupled to the base 502 and elevates the sensing system 520 above the base 502. In some embodiments, the sensing system 520 is pivotable and/or otherwise movable relative to the sensor post 522. In some embodiments, the sensing system 520 is fixed. In some embodiments, the sensing system 520 is positioned behind a window or see-through cover.

Figure 21:
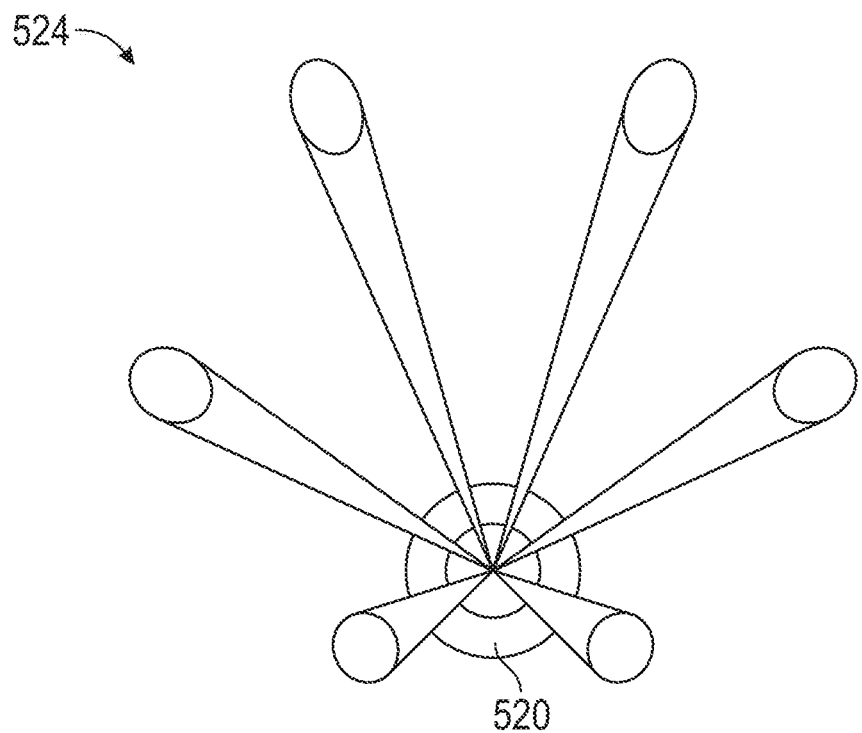
FIG. 21 is shows a detection array of the contactless infrared sensing and control system of FIGS. 17-20, according to an exemplary embodiment.

As shown in FIGS. 20 and 21, the sensing system 520 is configured to acquire a data array, shown as data array 524, from a plurality of locations of a pan 530 and/or from a plurality of pans 530. According to an exemplary embodiment, the data array 524 includes (i) radiation information regarding radiation reflected/emitted from the pans 530 and/or the food product (i.e., which is indicative of the temperature thereof) and/or (ii) identifying information regarding the type of food product.

The controller 510 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. The controller 510 may include a processing circuit having a processor and a memory. The processing circuit may include an ASIC, one or more FPGAs, a DSP, circuits containing one or more processing components, circuitry for supporting a microprocessor, a group of processing components, or other suitable electronic processing components. The processor may be configured to execute computer code stored in the memory to facilitate the activities described herein. The memory may be any volatile or non-volatile computer-readable storage medium capable of storing data or computer code relating to the activities described herein. The memory may include computer code modules (e.g., executable code, object code, source code, script code, machine code, etc.) configured for execution by the processor.

According to an exemplary embodiment, the controller 510 is configured to control operation of the thermal elements 508 based on the sensor data acquired by the sensing system 520. By way of example, the controller 510 may be configured to adaptively control the settings of the thermal element 508 based on temperature data acquired by the sensing system 520 for optimum cooking, warming, and/or cooling of the pans 530 and/or the food product. The controller 510 may be configured to monitor for hot and cold points (e.g., a temperature gradient across one or more pans 530) based on the data array 524. The controller 510 may additionally or alternatively be configured to identify separate pans 530 based on the sensor data and independently control the temperature at each pan 530 individually via the thermal elements 508, as necessary.

By way of another example, the controller 510 may be configured to adaptively control the settings of the thermal element 508 based on identifying data acquired by the sensing system 520 regarding the type of food product present. For example, based on the frequency of the light waves received by the sensing system 520 (e.g., the photodetector, etc.), the controller 510 may be configured to determine the type of food product present (e.g., using a look up table that has been created from previous testing, etc.).

By way of yet another example, the controller 510 may be configured to adaptively control the settings of the thermal element 508 based on wavelength data acquired by the sensing system 520. For example, by measuring the wavelengths that are bounced back off of the food products (not absorbed) (which may be used to determine the type of the food products), the controller 510 may be configured to control or tune the output of the thermal element 508 to a wavelength that is effective with the food type. Specifically, by knowing the spectrum/wavelengths of IR energy that is shining down onto the food product by the thermal element 508 (the "emitted wavelengths") (e.g., measured by the sensing system 520, determined by the controller 510 based on the settings of the thermal element 508, etc.), and by measuring the wavelengths that are reflected from the food product (the "reflected wavelengths"), the controller 510 can determine the wavelength absorbed by the food product (the "absorbed wavelengths"). Then, the controller 510 may be configured to adjust the emitted wavelengths from the thermal element 508 to that of the absorbed wavelengths (i.e., the wavelengths that are being absorbed by the food product), making the temperature-regulating unit 500 more energy efficient.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data that cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the temperature-regulating unit 10, the temperature-regulating system 300, and the temperature-regulating unit 500 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A temperature-regulating unit comprising:
 a base configured to support a pan;
 a thermal element positioned to thermally regulate the pan, the thermal element including at least one of a heating element, a cooling element, or a dual functioning heating/cooling element;
 a resonant tank having a sensing coil and a capacitor, wherein the resonant tank has a resonant frequency that is affected by a material of the pan and a temperature of the pan;
 a contactless sensing assembly including at least one of one or more infrared sensors or one or more scanning devices, the contactless sensing assembly positioned on top of or elevated above the base to acquire sensor data regarding at least one of the pan or a food product; and
 a controller configured to:
  receive a temperature setting;
  monitor the resonant frequency;
  determine the material of the pan based on the resonant frequency;

determine the temperature of the pan based on the resonant frequency; and adaptively control the thermal element based on the temperature of the pan, the material of the pan, and the temperature setting.

2. The temperature-regulating unit of claim 1, further comprising a trivet configured to be positioned between a surface of the base and the pan, wherein the trivet is configured to insulate the surface from the pan, wherein the resonant frequency is affected by at least one of a presence of the trivet or a position of the trivet relative to a central axis of the sensing coil, and wherein the thermal element is positioned beneath the surface.

3. The temperature-regulating unit of claim 2, wherein the controller is configured to at least one of:

detect the presence of the trivet and prevent activation of the thermal element in response to the trivet not being detected; or detect the position of the trivet relative to the central axis of the sensing coil and control an output device to provide at least one of a visual indication or an audible indication to a user to assist the user in centering the trivet relative to the central axis of the sensing coil.

4. The temperature-regulating unit of claim 3, wherein the controller is configured to:

detect the presence of the trivet; and prevent activation of the thermal element in response to the trivet not being detected.

5. The temperature-regulating unit of claim 3, wherein the controller is configured to:

detect the position of the trivet relative to the central axis of the sensing coil; and control an output device to provide at least one of a visual indication or an audible indication to a user to assist the user in centering the trivet relative to the central axis of the sensing coil.

6. A temperature-regulating unit comprising:

a base configured to support a pan;

a resonant tank having an inductive heating coil positioned within the base and a capacitor, the inductive heating coil positioned to thermally regulate the pan, the resonant tank having a resonant frequency that is affected by a material of the pan and a temperature of the pan, the resonant tank configured to acquire first sensor data regarding the pan including the resonant frequency;

a contactless sensing assembly including at least one of one or more infrared sensors or one or more scanning devices, the contactless sensing assembly positioned on top of or elevated above the base to acquire second sensor data regarding at least one of the pan or a food product; and a controller configured to:

receive the first sensor data from the resonant tank; and
adaptively control the inductive heating coil based on the first sensor data.

7. The temperature-regulating unit of claim 6, wherein the controller is configured to:

monitor the resonant frequency to determine a material of the pan and a temperature of the pan; and
control the inductive heating coil based on the material and the temperature.

8. The temperature-regulating unit of claim 6, wherein the controller is configured to:

monitor the resonant frequency to determine whether the pan is present; and prevent activation of the inductive heating coil in response to determining that the pan is not present.

9. A temperature-regulating unit comprising:

a base configured to support at least one of a pan or a food product;

a thermal element positioned to thermally regulate the at least one of the pan or the food product, the thermal element including at least one of a heating element, a cooling element, or a dual functioning heating/cooling element;

a resonant tank having a sensing coil and a capacitor, wherein the resonant tank has a resonant frequency that is affected by a material of the pan and a temperature of the pan;

a contactless sensing assembly including at least one of one or more infrared sensors or one or more scanning devices, the contactless sensing assembly positioned on top of or elevated above the base to acquire sensor data regarding the at least one of the pan or the food product; and a controller configured to:

receive the sensor data from the contactless sensing assembly; and
adaptively control the thermal element based on the sensor data.

10. The temperature-regulating unit of claim 9, wherein the sensor data includes at least one of temperature data or identifying data, and wherein at least one of:

the contactless sensing assembly is configured to acquire the temperature data regarding a temperature of the at least one of the pan or the food product, and the controller is configured to adaptively control the thermal element based on the temperature; or the contactless sensing assembly is configured to acquire the identifying data regarding a type of the food product, and the controller is configured to adaptively control the thermal element based on the type.

11. The temperature-regulating unit of claim 10, wherein:

the sensor data includes the identifying data;

the contactless sensing assembly is configured to acquire the identifying data regarding the type of the food product; and the controller is configured to adaptively control the thermal element based on the type.

12. The temperature-regulating unit of claim 10, wherein:

the sensor data includes the temperature data and the identifying data;

the contactless sensing assembly is configured to:

acquire the identifying data regarding the type of the food product; and acquire the temperature data regarding the temperature of the at least one of the pan or the food product; and the controller is configured to adaptively control the thermal element based on the temperature and the type.

13. The temperature-regulating unit of claim 9, wherein the sensor data includes wavelength data, wherein the contactless sensing assembly is configured to acquire the wavelength data regarding emitted wavelengths that are emitted by the thermal element or reflected wavelengths that are reflected by the food product, wherein the controller is configured to determine absorbed wavelengths that are absorbed by the food product based on the emitted wavelengths and the reflected wavelengths, and wherein the controller is configured to adjust the emitted wavelengths of the thermal element to the absorbed wavelengths.

14. The temperature-regulating unit of claim 9, further comprising an overhead support coupled to the base and positioned to extend over the at least one of the pan or the food product, wherein at least one of the thermal element or the contactless sensing assembly is supported by the overhead support.

15. The temperature-regulating unit of claim 14, wherein the thermal element and the contactless sensing assembly are supported by the overhead support.

16. The temperature-regulating unit of claim 14, wherein the contactless sensing assembly is supported by the overhead support.

17. The temperature-regulating unit of claim 14, wherein the thermal element is supported by the overhead support.

\* \* \* \* \*